(12) United States Patent
Inoue et al.

(10) Patent No.: US 8,554,960 B2
(45) Date of Patent: Oct. 8, 2013

(54) INPUT DEVICE

(75) Inventors: Susumu Inoue, Kyoto (JP); Haruki Tojo, Kyoto (JP)

(73) Assignee: Nintend Co., Ltd., Kyoto (JP)

(*) Notice: Subject to any disclaimer, the term of this patent is extended or adjusted under 35 U.S.C. 154(b) by 129 days.

(21) Appl. No.: 12/821,558

(22) Filed: Jun. 23, 2010

(65) Prior Publication Data

US 2011/0271013 A1 Nov. 3, 2011

(30) Foreign Application Priority Data

Apr. 30, 2010 (JP) ................................. 2010-104793

(51) Int. Cl.
*G06F 3/00* (2006.01)
*G06F 3/033* (2013.01)
*G01N 31/10* (2006.01)
*G01N 33/00* (2006.01)
*G01C 9/00* (2006.01)
*G01C 17/00* (2006.01)
*G01C 19/00* (2013.01)

(52) U.S. Cl.
USPC ............... 710/14; 436/37; 436/38; 702/153; 345/158

(58) Field of Classification Search
USPC .......... 710/14; 436/37, 38; 702/153; 345/158
See application file for complete search history.

(56) References Cited

U.S. PATENT DOCUMENTS

| | | | |
|---|---|---|---|
| 7,351,152 B2* | 4/2008 | Abe et al. | 463/43 |
| 7,636,645 B1* | 12/2009 | Yen et al. | 702/152 |
| 2009/0325710 A1* | 12/2009 | Filer et al. | 463/42 |
| 2010/0007528 A1* | 1/2010 | Urata et al. | 341/20 |
| 2010/0009762 A1* | 1/2010 | Takeda et al. | 463/47 |
| 2010/0113153 A1* | 5/2010 | Yen et al. | 463/37 |

FOREIGN PATENT DOCUMENTS

JP 4255510 2/2009

* cited by examiner

*Primary Examiner* — Henry Tsai
*Assistant Examiner* — Eric Oberly
(74) *Attorney, Agent, or Firm* — Nixon & Vanderhye P.C.

(57) ABSTRACT

In an input device, a controller for controlling an input portion and acquiring data is connected to a bus. The bus can be connected with an external expansion device via an expansion connector. The connection of the bus from the expansion connector to the controller is switched on and off by a switcher. Data acquired from a sensor having a function equivalent to that of the external expansion device is transmitted to the controller via the bus by a sensor controller which is connected to each of a side of the controller and a side of the expansion connector of the bus without interposing the switcher. The sensor controller switches the connection of the switcher off when an access to itself is made from the controller.

11 Claims, 22 Drawing Sheets

FIG. 2
(A)
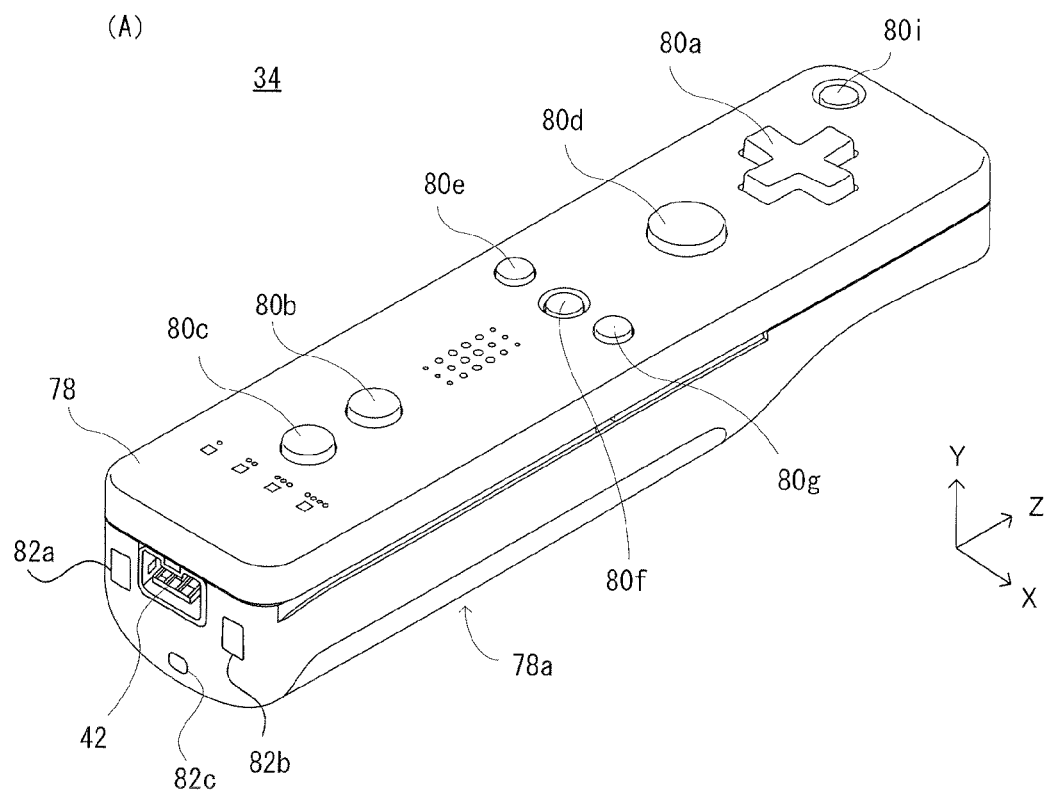
(B)
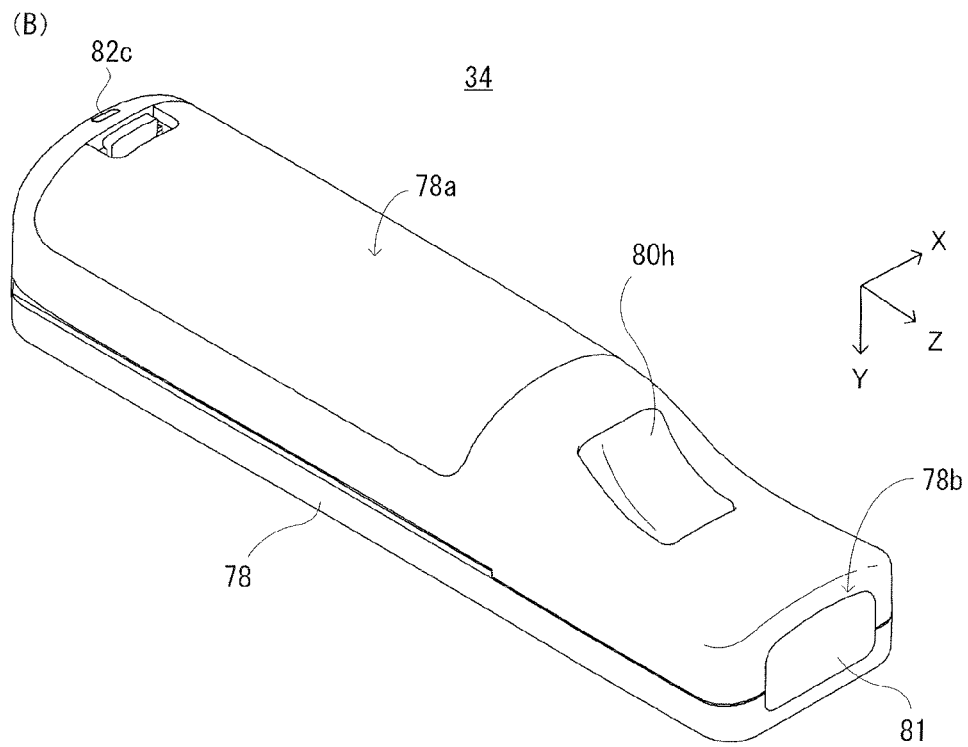

FIG. 4
(A)
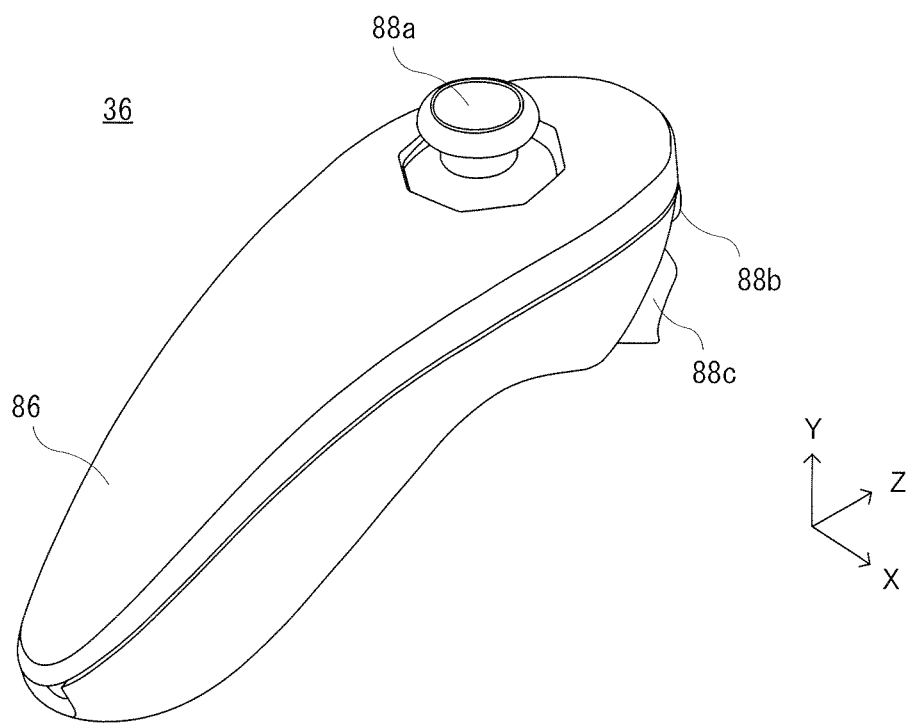
(B)
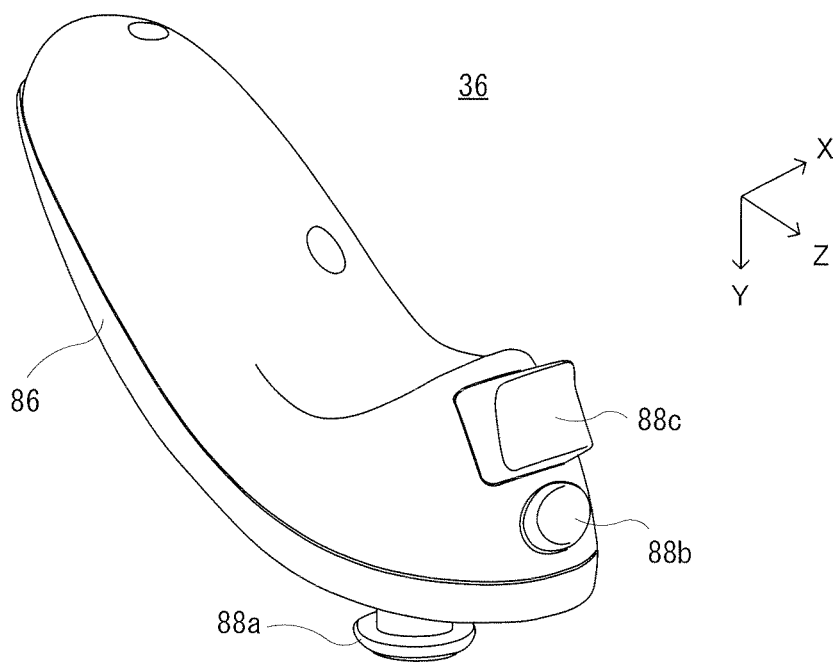

FIG. 7
(A)
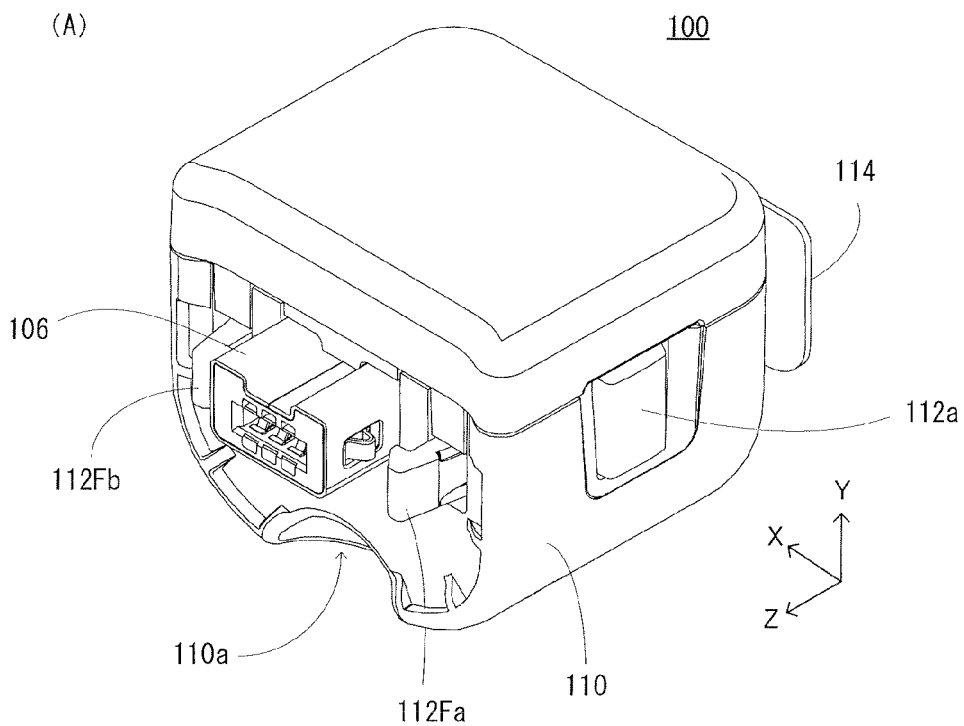
(B)
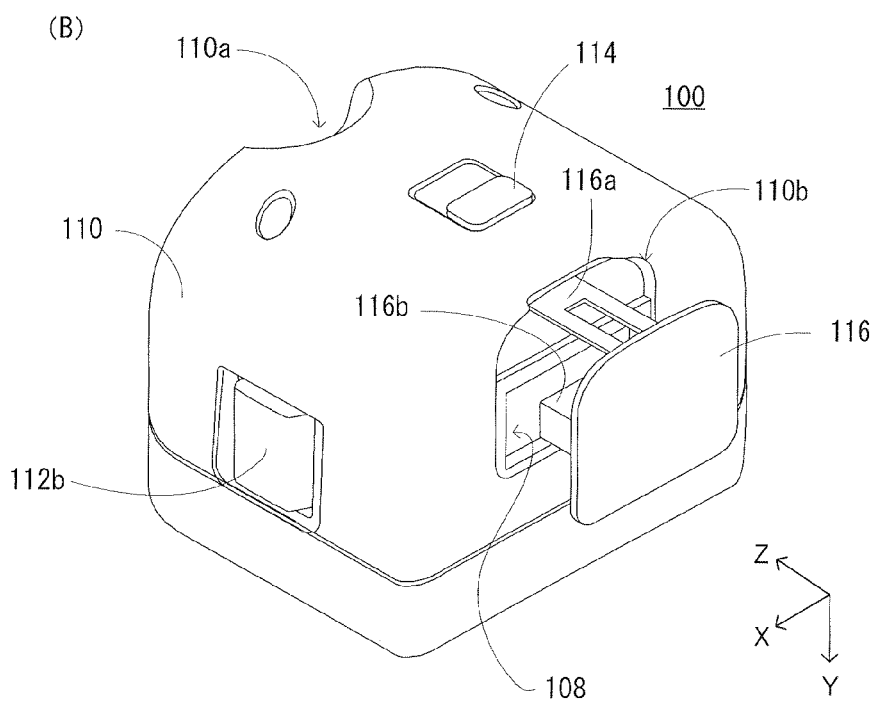

FIG. 17

(A) (DATA FORMAT FOR GYRO)

| YAW ANGULAR VELOCITY DATA |
| --- |
| ROLL ANGULAR VELOCITY DATA |
| PITCH ANGULAR VELOCITY DATA |
| YAW ANGULAR VELOCITY MODE INFORMATION |
| ROLL ANGULAR VELOCITY MODE INFORMATION |
| PITCH ANGULAR VELOCITY MODE INFORMATION |
| SECOND CONTROLLER CONNECTION INFORMATION |
| GYRO/SECOND CONTROLLER IDENTIFYING INFORMATION |

(B) (DATA FORMAT FOR SECOND CONTROLLER)

| X STICK OPERATION DATA |
| --- |
| Z STICK OPERATION DATA |
| X ACCELERATION DATA |
| Y ACCELERATION DATA |
| Z ACCELERATION DATA |
| BUTTON OPERATION DATA |
| SECOND CONTROLLER CONNECTION INFORMATION |
| GYRO/SECOND CONTROLLER IDENTIFYING INFORMATION |

FIG. 18

(A) (DATA FORMAT FOR FIRST CONTROLLER)

| X ACCELERATION DATA |
| Y ACCELERATION DATA |
| Z ACCELERATION DATA |
| POSITION COORDINATE DATA |
| BUTTON OPERATION DATA |

(B) (ACCESS DATA)

| ADDRESS | R/W | DATA |
| --- | --- | --- |
| #3 | WRITE | SPECIFIC ADDRESS IN CORRESPONDENCE WITH MODE CHANGE AND MODE INFORMATION |
| #3 | READ | ADDRESS CORRESPONDING TO READING OF DEVICE INFORMATION |

(A) MODE CONTROL OF GYRO CONTROLLER 85C

| MODE<br>CONTROLLED OBJECT | STANDBY | BYPASS | GYRO | GYRO & SECOND CONTROLLER |
|---|---|---|---|---|
| GYRO FUNCTION | NO ACTIVE | NO ACTIVE | ACTIVE | ACTIVE |
| GYRO POWER SOURCE | OFF | OFF | ON | ON |
| BUS SWITCH (SW1) | CONNECT | CONNECT | DISCONNECT | DISCONNECT |
| EXPANSION CONNECTOR | NO ACTIVE | ACTIVE | NO ACTIVE | ACTIVE |
| Attach 1 | LOW | HIGH | HIGH | HIGH |
| BUS ADDRESS | SPECIAL (#3) | SPECIAL (#3) | NORMAL (#4) | NORMAL (#4) |

(B) MODE TRANSITION OF GYRO CONTROLLER 85C

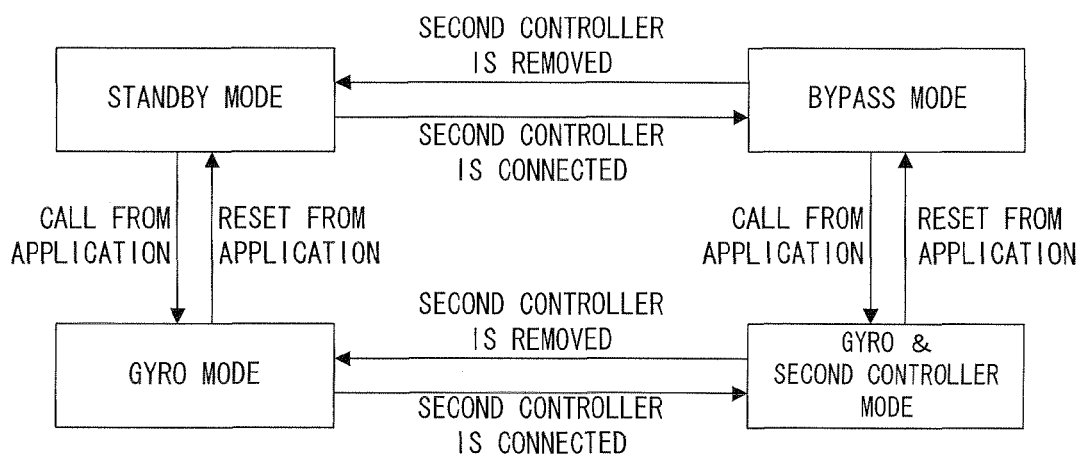

FIG. 20

(A) MODE CONTROL OF GYRO CONTROLLER 104C UNDER CONTROL OF GYRO CONTROLLER 85C

| MODE<br>CONTROLLED OBJECT | STANDBY | BYPASS | GYRO<br>(EQUIVALENT TO STANDBY) | GYRO & SECOND CONTROLLER<br>(EQUIVALENT TO BYPASS) |
|---|---|---|---|---|
| GYRO FUNCTION | NO ACTIVE | NO ACTIVE | NO ACTIVE | NO ACTIVE |
| GYRO POWER SOURCE | OFF | OFF | OFF | OFF |
| BUS SWITCH (SW2) | CONNECT | CONNECT | CONNECT | CONNECT |
| EXPANSION CONNECTOR | NO ACTIVE | Active | NO ACTIVE | Active |
| Attach 1 | LOW | HIGH | LOW | HIGH |
| BUS ADDRESS | SPECIAL (#3) | SPECIAL (#3) | SPECIAL (#3) | SPECIAL (#3) |

(B) MODE TRANSITION OF GYRO CONTROLLER 104C UNDER CONTROL OF GYRO CONTROLLER 85C

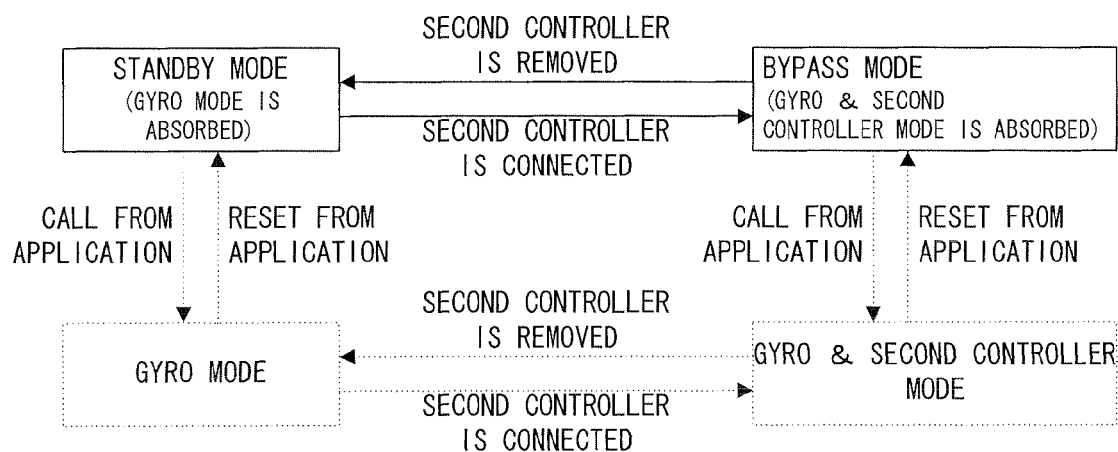

INPUT DEVICE

CROSS REFERENCE OF RELATED APPLICATION

The disclosure of Japanese Patent Application No. 2010-404793 is incorporated herein by reference.

BACKGROUND OF THE INVENTION

1. Field of the Invention

The present invention relates to an input device. More specifically, the present invention relates to an input device for transmitting input data from at least one input portion to an information processing apparatus.

2. Description of the Related Art

One example of an input device of such a kind is disclosed in Japanese Patent No. 4255510 (Patent Document 1). In the related art, an operating device (first controller) has an imaged information arithmetic section and an acceleration sensor, etc. as an input portion, and transmits position coordinate data from the imaged information arithmetic section, acceleration data from the acceleration sensor, etc. as input data to an information processing apparatus (game apparatus).

Furthermore, the operating device is connected with an expansion operating device (gyro sensor unit) including a gyro sensor as another input potion via an expansion connector (common bus). The operating device is used so as to be integrated with the expansion operating device, and alternately transmits position coordinate data from the imaged information arithmetic section, acceleration data from the acceleration sensor, etc. as first input data and angular velocity data from the gyro sensor as second input data to the information processing apparatus.

Then, the expansion connector can be connected with other expansion operating device (second controller).

However, the related art is for connecting the expansion operating device to the expansion connector, and therefore, the size of the operating device may be increased.

Then, even if a sensor the same as that in the expansion operating device is integrated in the operating device in order to improve the operating device in the Patent Document 1, the expansion connector can be connected with other expansion operating devices in order to maintain compatibility, so that the shape of the connector is required to be the same. Furthermore, depending on the expansion operating device, it is preferable that the shape of the housing is the same. Accordingly, even if the operating device integrated with the sensor is newly provided, it is assumed that it is provided to be physically connectable with the expansion operating device of the Patent Document 1. Thus, in a case that the operating device and the expansion operating device which are described in the Patent Document land the operating device integrated with the sensor are available, the user may erroneously connect the expansion operating device to the operating device integrated with the sensor, and in such a case, the same sensors may be connected to a common bus. In this case, the same address is assigned to both of the sensors, and data contention may occur on the common bus.

SUMMARY OF THE INVENTION

Therefore, it is a primary object of the present invention to provide a novel input device.

Another object of the present invention is to provide, when in place of an input device to be used so as to be connected with an external expansion device, an input device integrated with a device having a function equivalent to that of the external expansion device is newly provided, the new input device with compatibility maintained.

A still another object of the present invention is to provide a malfunction, etc. from occurring even when an erroneous external expansion device is connected to the aforementioned input device integrated with the device.

The present invention adopts the following configurations for the purpose of solving the aforementioned problems.

A first invention is an input device transmitting input data from at least one input portion to an information processing apparatus comprises: a controller which is connected to a predetermined bus, controls the input portion, and acquires data; an expansion connector which connects various devices including a predetermined external expansion device to the bus; a switcher which switches on and off a connection of the bus from the expansion connector to the controller; a sensor which has a function being equivalent to the external expansion device; and a sensor controller which is for transmitting data acquired from the sensor to the controller via the bus, and is connected to a side of the controller and a side of the expansion connector of the bus without interposing the switcher, and controls the switcher on and off, wherein the sensor controller switches the connection of the switcher off when an access to itself from the controller is made.

In the first invention, a controller which controls an input portion and acquires data is connected to a predetermined bus. The bus is connected with a predetermined external expansion device via an expansion connector, or may be connected with other device in place of or in addition to the external expansion device. The connection of the bus from the expansion connector to the controller is switched on or off by a switcher. The data acquired from the sensor having a function equivalent to the external expansion device is transmitted to the controller via the bus by a sensor controller which is connected to the side of the controller and the side of the expansion connector of the bus without interposing the switcher, and controls the switcher on or off. The sensor controller switches the connection of the switcher off when an access to itself is made from the controller.

According to the first invention, in response to an access from the controller to the sensor controller, the connection from the expansion connector to the controller is switched off, and therefore, even if the external expansion device is connected with the expansion connector, a problem, such as data contention, etc. may be prevented between the sensor and the external expansion device. Thus, the shape of the housings may be the same, so that compatibility with the external expansion device is maintained.

A second invention is an input device according to the first invention, and the sensor controller transmits a signal for transmitting data from the external expansion device to the side of the expansion connector, and discards data transmitted on the basis of the signal from the expansion connector when an access from the controller to itself is made.

In the second invention, when an access from the controller to the sensor controller is made, a signal for transmitting data from the external expansion device is transmitted from the sensor controller to the side of the expansion connector, and data transmitted from the external expansion device through the expansion connector is discarded by the sensor controller.

According to the second invention, when an access is made, by transmitting a signal to the external expansion device, the external expansion device is caused to transmit data, and the transmitted data is discarded, and therefore, even if an access reaches the device, the device can be returned to the original state.

A third invention is an input device according to the first or the second invention, and the sensor is a gyro sensor.

In the third invention, angular velocity data acquired from the gyro sensor is transmitted to the controller via the bus.

According to the third invention, the angular velocity is equal irrespective of which part of the input device the gyro sensor is attached, and therefore, the position of the sensor is changed due to be integrated, the information processing can be performed similar to a case that the sensor is externally attached.

A fourth invention is an input device according to any one of the first to third inventions, and as to an access from the controller, a content of an instruction is transmitted following information indicating an object to be accessed, and the sensor controller determines whether or not the object to be accessed from the controller is itself, and switches the connection of the switcher off before the instruction from the controller is transmitted to the expansion connector if the object to be accessed from the controller is itself.

In the fourth invention, an access from the controller includes information indicating an object and a content of an instruction. The information indicating the object is first transmitted, and the content of the instruction is secondly transmitted. Thus, the sensor controller determines whether or not the object is itself on the basis of the information first transmitted, and if it is determined that the object is itself, the connection of the switcher can be switched off before the content of the instruction is transmitted.

According to the fourth invention, even if the external expansion device is connected to the expansion connector, an instruction from the controller does not reach the external expansion device, and therefore, it is possible to prevent a malfunction of the external expansion device due to the instruction from the controller from occurring.

A fifth invention is an input device according to the fourth invention, and the sensor controller has a plurality of modes including at least a mode in which the sensor is used and a mode in which the sensor is not used, and makes a mode transition, activates the sensor, and transmits data from the sensor to the controller thereafter if the content of the instruction from the controller is a mode transition from the mode in which the sensor is not used to the mode in which the sensor is used.

According to the fifth invention, a mode transition from the controller to the sensor controller does not reach the external expansion device, and this makes it possible to make only the sensor controller make a mode transition and start to use the sensor.

A sixth invention is an input device according to the fifth invention, and the sensor controller, if other device is connected via the expansion connector in the mode in which the sensor is used, acquires data from the other device, and alternately transmits the data from the other device and data acquired from the sensor to the controller.

In the sixth invention, when other device is connected via the expansion connector in the mode in which the sensor is used, data from the other device and data acquired from the sensor are alternately transmitted to the controller.

According to the sixth invention, by using the data from the other device in addition to the data acquired from the sensor, more variable information processing may be made possible.

A seventh invention is an input device according to the fifth or the sixth invention, and the sensor controller further switches the connection of the switcher on when a mode transition to the mode in which the sensor is not used is instructed from the controller in the mode in which the sensor is used.

In the seventh invention, in accordance with a mode transition from the mode in which the sensor is used to the mode in which the sensor is not used, the connection of the switcher is changed from off to on. Thus, in the mode in which the sensor is not used, a bypass from the expansion connector to the controller is made, and therefore, the data from the other device connected to the expansion connector can be transmitted to the controller without interposing the sensor controller.

According to the seventh invention, it is possible to reduce load on the sensor controller.

An eighth invention is an input device according to the fourth invention, and the information indicating the object to be accessed and the content of the instruction when the object to be accessed from the controller is itself is the same signal as that for controlling the external expansion device.

According to the eighth invention, the controller can access the sensor controller by using the signal the same as that (access data) for controlling the external expansion device, and therefore, the controller is not required to be changed.

A ninth invention is an input device transmitting input data from at least one input potion to an information processing apparatus, and in the input device comprising: a controller which is connected to a predetermined bus, controls the input portion, and acquires data; an expansion connector which connects various devices including a predetermined external expansion device to the bus; a switcher which switches on or off a connection of the bus from the expansion connector to the controller; a sensor which has a function being equivalent to that of the external expansion device; and a sensor controlling computer which transmits data acquired from the sensor to the controller via the bus, is connected to a side of the controller and a side of the expansion connector of the bus without interposing the switcher, and controls the switcher on or off, the sensor controlling program causes the sensor controlling computer to function as a means which switches the connection of the switcher off when an access to itself is made from the controller.

In the ninth invention as well, similar to the first invention, even if the external expansion device is connected to the expansion connector, a problem, such as data contention, etc. may be prevented.

According to the present invention, it is possible to, when in place of an input device to be used with an external expansion device connected, an input device integrated with a device having a function equivalent to that of the external expansion device is newly provided, the new input device with compatibility maintained. Additionally, even if a conventional external expansion device is erroneously connected to such an input device integrated with the device, it is possible to prevent a malfunction, etc. from occurring.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing an appearance of a first controller to be applied to FIG. 1 embodiment, FIG. 2(A) is a perspective view of the first controller as viewed from above rear, and FIG. 2(B) is a perspective view of the first controller as viewed from below front;

FIG. 4 is an illustrative view showing an appearance of a second controller applied to FIG. 1 embodiment, FIG. 4(A) is a perspective view of the second controller as viewed from above rear, and FIG. 4(B) is a perspective view of the second controller as viewed from below front;

FIG. 7 is an illustrative view showing an appearance of a gyro sensor unit applied to FIG. 1 embodiment, FIG. 7(A) is a perspective view of the gyro sensor unit as viewed from above front, and FIG. 7(B) is a perspective view of the gyro sensor unit as viewed from rear back;

FIG. 17 is an illustrative view showing a data format to be handled by the gyro controller of the first controller, FIG. 17(A) shows a data format for the gyro, and FIG. 17(B) shows a data format for the second controller;

FIG. 18 is an illustrative view showing a data format to be handled by the gyro controller of the first controller, FIG. 18(A) shows a data format for the first controller, and FIG. 18(B) shows a format of access data;

FIG. 19 is an illustrative view showing an operation of the integrated gyro of the first controller, FIG. 19(A) shows a mode control, and FIG. 19(B) shows a mode transition;

FIG. 20 is an illustrative view showing an operation of the gyro sensor unit under the control of the first controller, FIG. 20(A) shows a mode control, and FIG. 20(B) shows a mode transition;

DETAILED DESCRIPTION OF THE PREFERRED EMBODIMENTS

One embodiment of the present invention is explained in detail later with reference to the drawings. First, a relationship between the aforementioned Patent Document 1 (Japanese Patent Laying-open No. 4255510) and the present invention is explained. This embodiment contains in an input device (first controller) a device (gyro sensor) being equivalent to a device provided to an expansion operating device (gyro sensor unit) described in the embodiment of the Patent Document 1. Thus, the input device (first controller) of this embodiment has a function being equivalent to the first controller with the gyro sensor unit in the Patent Document 1. A second controller and an information processing apparatus (game apparatus) of this embodiment have configurations the same as those in the Patent Document 1 and perform similar operations. The gyro sensor unit appearing in this embodiment is also equal to that in the Patent Document 1, and explained below is a case that another gyro sensor unit the same as that described in the Patent Document 1 is further erroneously connected. However, these are merely one embodiment, and it is needless to say that the present invention can be applied to ones other than the same thing as the device in the Patent Document 1. That is, the present invention can be applied when in place of the conventional external expansion device, an input device integrated with a function equivalent to that of this device is newly provided without being restricted to the device described in the Patent Document 1.

The first controller of this embodiment contains a gyro sensor, and thus, another gyro sensor unit need not be connected, but the shapes of the connectors are common therebetween, so that the first controller may be erroneously connected with another connector. However, even if another gyro sensor is erroneously connected to the first controller of this embodiment, by the microcomputer control by the first controller, data contention between equivalent devices can be prevented to make the first controller function normally. In a case that the second controller is connected to the first controller via the gyro sensor unit as well, each controller works without question to allow the game apparatus to perform game processing based on the data from each controller.

That is, the first controller of this embodiment is characterized in that it maintains compatibility with a conventional expansion device, such as a second controller under the control of the microcomputer while integrating the gyro sensor in place of the conventional first controller described in the Patent Document 1.

Figure 3:
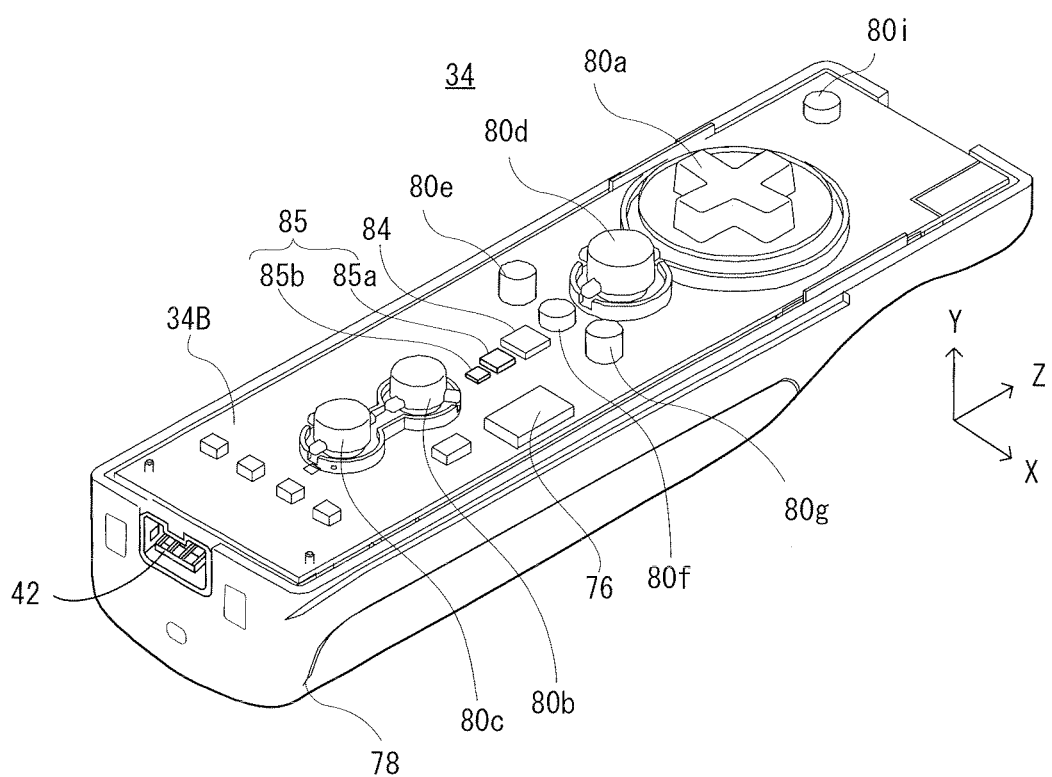
FIG. 3 is an illustrative view showing an internal configuration of the first controller to be applied to FIG. 1 embodiment.
Figure 13:
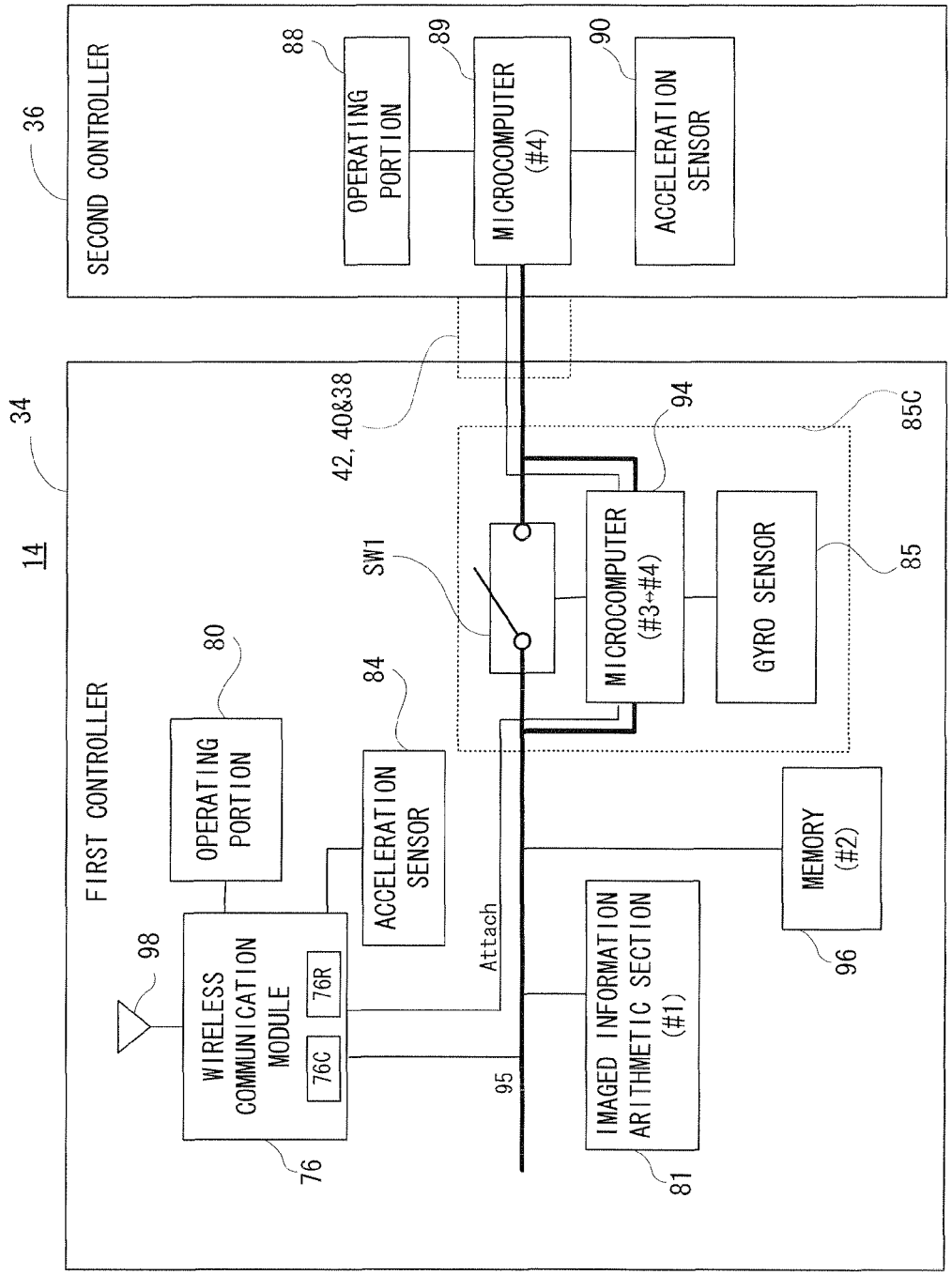
FIG. 13 is a block diagram showing one example of an overall electric configuration of the controller applied to FIG. 1 embodiment, and showing a state that the second controller is connected to the first controller.
Figure 14:
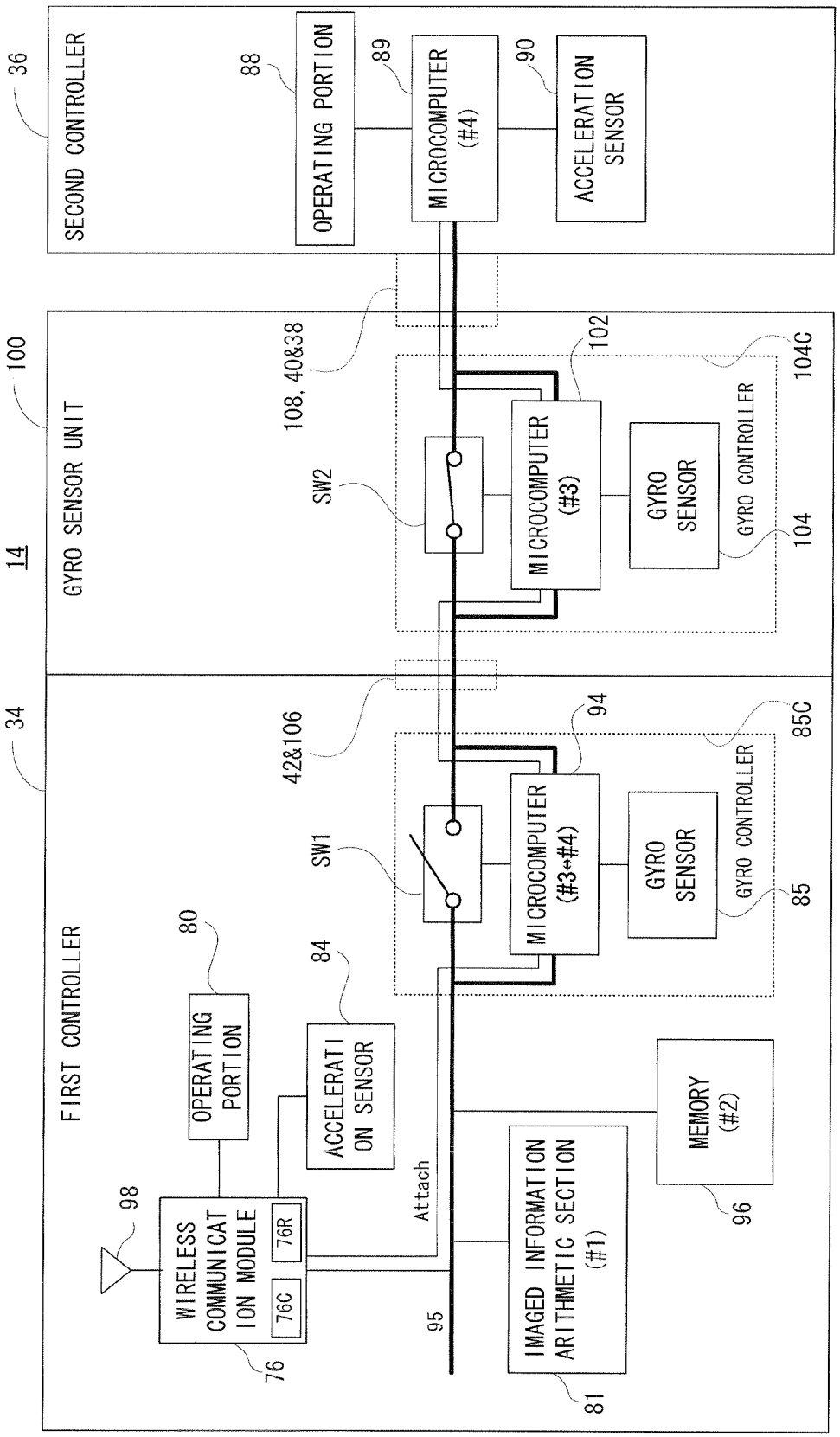
FIG. 14 a block diagram showing another example of an overall electric configuration of the controller applied to FIG. 1 embodiment, and showing a state that the second controller is connected to the first controller via the gyro sensor unit.
Figure 15:
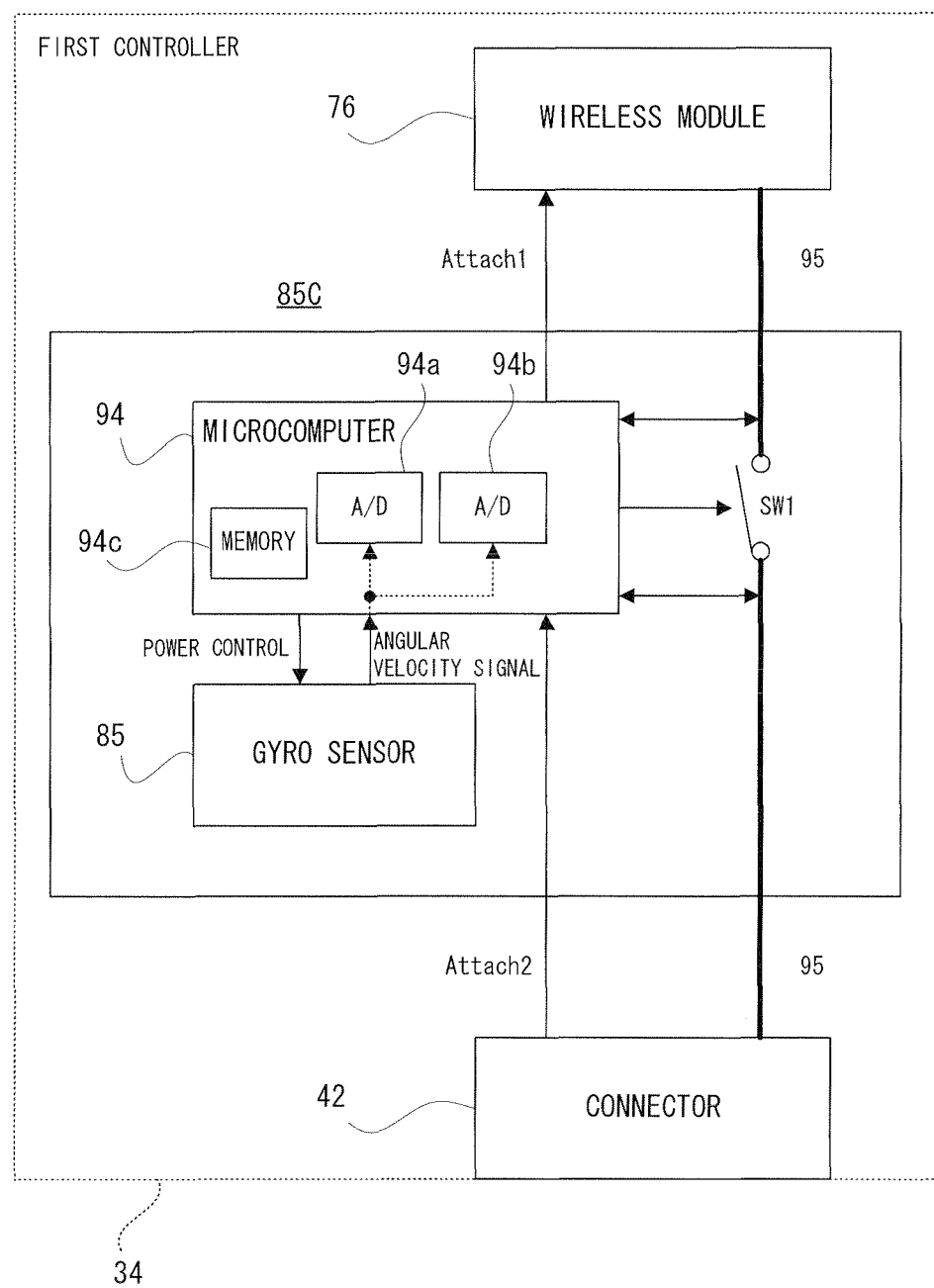
FIG. 15 is a block diagram showing a configuration example of an important part of the first controller (gyro controller 85C)
Figure 16:
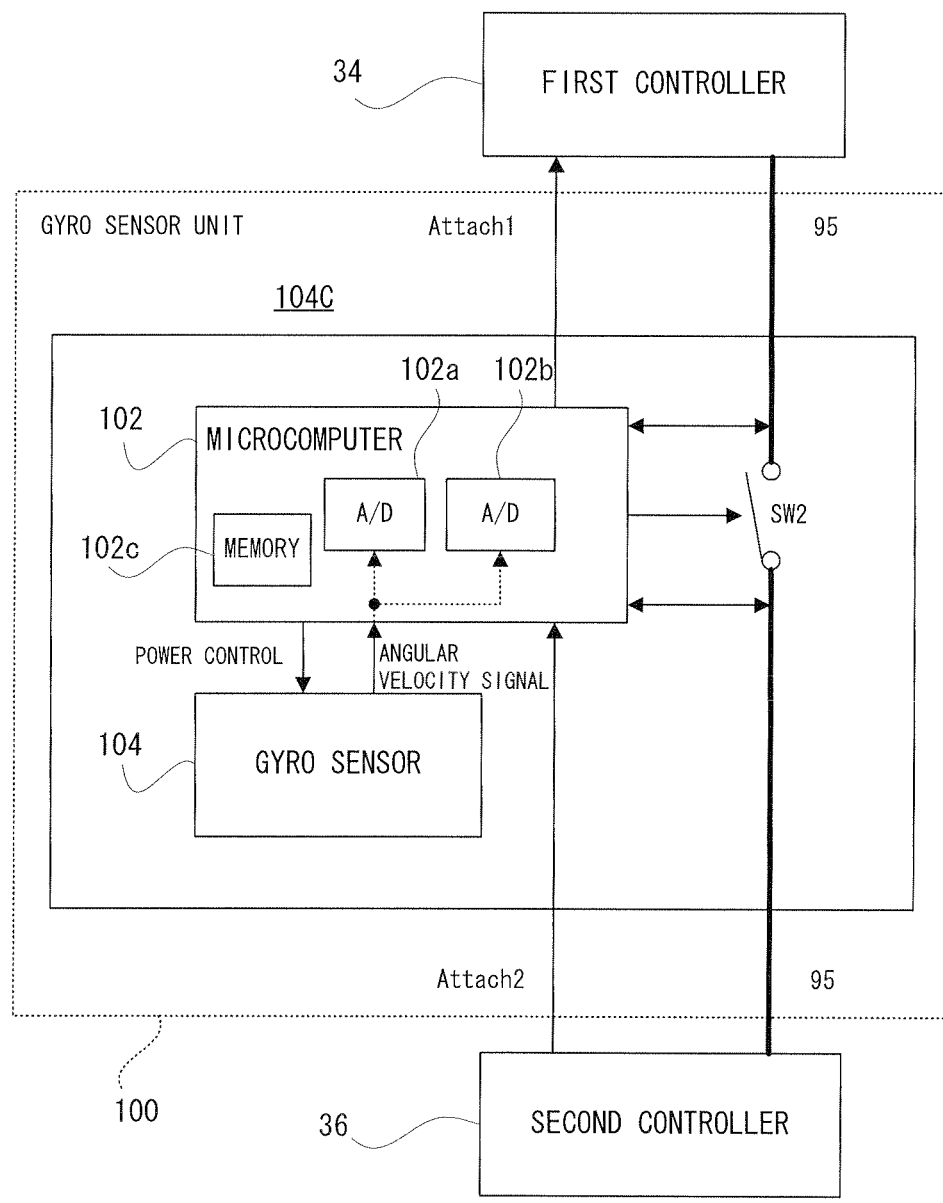
FIG. 16 is a block diagram showing a configuration example of an important part of the gyro sensor unit (gyro controller 104C)

The internal configuration of the first controller 34 is shown in FIG. 3. The overall electric configuration of the controller 14 is shown in FIG. 13 and FIG. 14 as to a case that the gyro sensor unit 100 is not interposed between the first controller 34 and the second controller 36 and a case that the gyro sensor unit 100 is interposed, respectively. That is, FIG. 14 is a situation in which the gyro sensor unit 100 is erroneously connected. The configuration of the important part of the first controller 34 (gyro controller 85C) is shown in FIG. 15, and the configuration of the important part of the gyro sensor unit 100 (gyro controller 104C) is shown in FIG. 16.

A data format for the first controller is shown in FIG. 18(A). A format of access data to be used in the mode control in the first controller is shown in FIG. 18(B). A mode control and a mode transition in the first controller 34 are shown in FIG. 19(A) and FIG. 19(B), respectively. Here, the mode control and the mode transition are similar to those performed when the gyro sensor unit 100 is connected to the conventional first controller. The mode control and the mode transition which are performed when the gyro sensor unit 100 is connected to the first controller 34 are shown in FIG. 20(A) and FIG. 20(B), respectively. Here, in the mode control and the mode transition, a gyro mode and a gyro & second controller mode are equivalent to (or absorbed in) a standby mode and a bypass mode. Then, a microcomputer control by the first controller 34 is shown in FIG. 21-FIG. 24.

Figure 1:
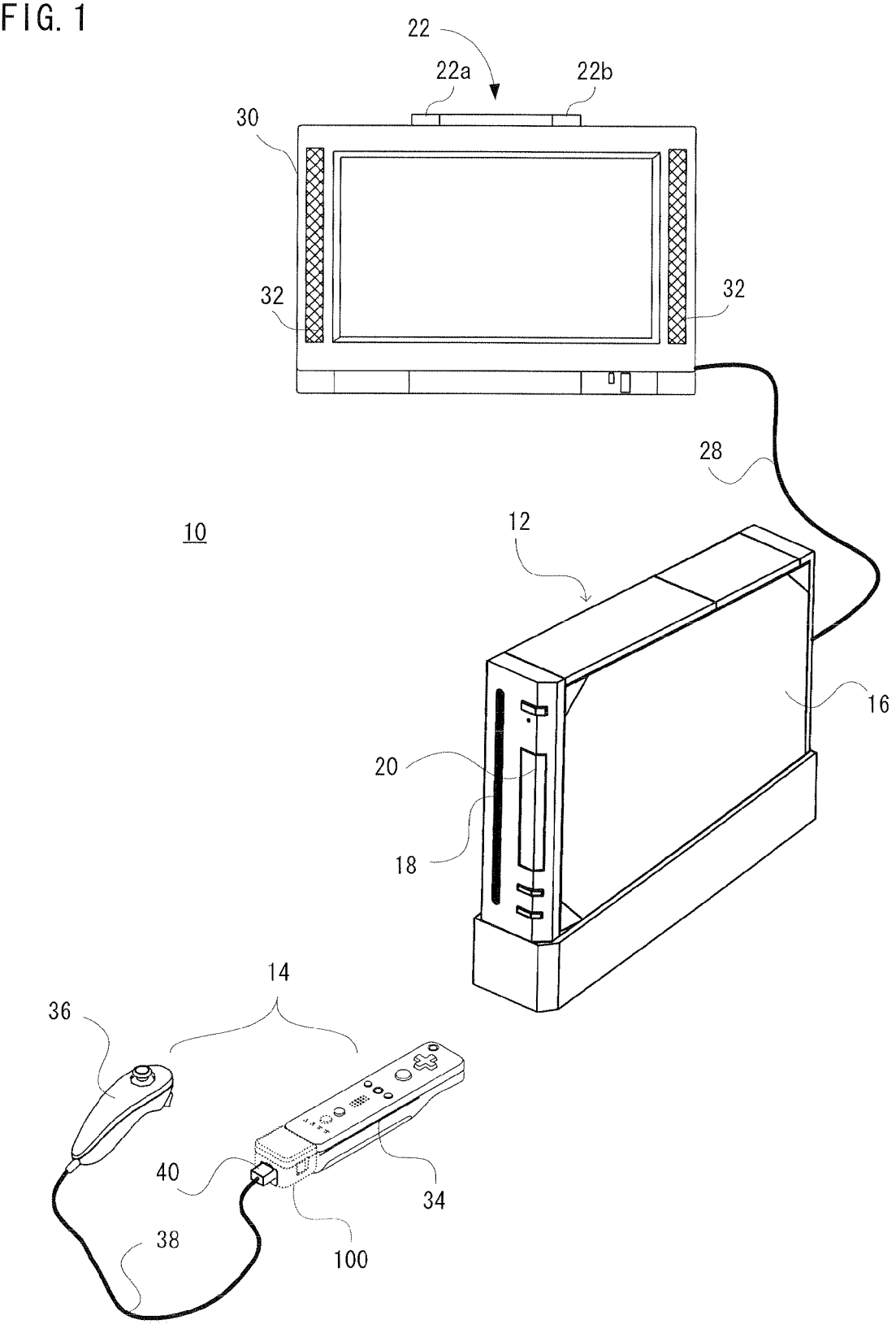
FIG. 1 is a block diagram showing a configuration of one embodiment of the present invention.

Now, referring to FIG. 1, a game system 10 of one embodiment of the present invention includes a game apparatus 12 and a controller 14. The game apparatus 12 is a game console. The controller 14 is an input device or an operating device by a user or a player. The game apparatus 12 and the controller 14 are connected wirelessly.

The game apparatus 12 includes a roughly rectangular parallelepiped housing 16, and the housing 16 is furnished with a disk slot 18 and a memory card slot cover 20 on a front surface. An optical disk 66 (FIG. 11) as one example of an information storage medium storing game program and data, etc. is inserted from the disk slot 18 to be loaded into a disk drive 54 (see FIG. 11) within the housing 16. Inside the external memory card slot cover 20 is provided with a connector for external memory card 62 (FIG. 11) through which a memory card (not shown) is inserted. The external memory card is employed for loading the game program, etc. read from the optical disk 66 to temporarily store it, storing (saving) game data (result data or proceeding data of the game) of the game played by means of the game system 10, and so forth. It should be noted that storing the game data described above may be performed on an internal memory such as a flash memory in place of the external memory card.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect is output from integrated speakers 32.

Additionally, around the monitor 30 (upper side of the monitor 30 in this embodiment), a marker unit 22 having two infrared ray LEDs (markers) 22a and 22b is provided. Each of the markers 22a and 22b outputs infrared rays ahead of the monitor 30.

Furthermore, the power of the game apparatus 12 is applied by means of a general AC adapter (not illustrated). The AC adapter is connected to a standard wall outlet for home use, and transforms the house current to a low DC voltage signal suitable for driving the game apparatus 12. In another embodiment, a battery may be utilized as a power supply. Here, the marker unit 22 is connected with the game apparatus 12 through a power-supply wire not shown, and is supplied with power from the game apparatus 12.

The controller 14, which is described in detail later, includes a first controller 34 and a second controller 36 each capable of being held with one hand and a gyro sensor unit 100 to be attached to the first controller 34. On a rear end surface of the first controller 34, a connector 42 (FIG. 2(A), FIG. 3, FIG. 13 and FIG. 14) is provided, and at an end of a cable 38 extending from the rear end of the second controller 36, a connector 40 (FIG. 5, FIG. 6, FIG. 13, and FIG. 14) is provided, and on a front end surface and a rear end surface of the gyro sensor unit 100, connectors 106 and 108 (FIG. 7(A), FIG. 7(B), FIG. 13 and FIG. 14) are respectively provided. The connector 106 at the front end surface of the gyro sensor unit 100 is connectable to the connector 42 of the first controller 34, and the connector 40 of the second controller 36 is connectable to the connector 42 of the first controller 34 or the connector 108 at the rear end surface of the gyro sensor unit 100.

Here, in order to play the game, the gyro sensor unit 100 is not necessary, and it is preferable that the second controller 36 is used to be directly connected to the first controller 34 without interposing the gyro sensor unit 100, but in this embodiment, in order to explain a case that the gyro sensor unit 100 is erroneously connected is, the gyro sensor unit 100 is connected.

By connecting the connector 106 to the connector 42, the gyro sensor unit 100 is physically and electrically connected to the first controller 34. However, from the gyro sensor unit 100 thus attached (connected as a single unit) to the first controller 34, angular velocity data indicating an angular velocity of the first controller 34 is not output (described in detail later). If the gyro sensor unit 100 is attached to the first controller as described in the Patent Document 1, angular velocity data is output.

In a case that the gyro sensor unit 100 is thus attached to the first controller 34, the connector 40 of the second controller 36 is connected to the connector 108 at the rear end surface of the gyro sensor unit 100. That is, the connector 42 has a structure selectively connectable to either of the connector 106 or the connector 40, and the connector 40 has a structure of selectively connectable to either of the connector 42 or the connector 108. Accordingly, the connector 106 and the connector 108 provided to the gyro sensor unit 100 cannot actually be connected because of being a part of the same housing, but have shapes connectable with each other. Input data from the second controller 36 is applied to the first controller 34 via the cable 38 and the gyro sensor unit 100. The first controller 34 transmits controller data including input data from the first controller 34 itself, and input data from the second controller 36 to the game apparatus 12. The input data of the first controller 34 includes angular velocity data from the gyro sensor 85 (FIG. 3, FIG. 13-FIG. 15) integrated in the first controller 34 itself (described in detail later).

Alternatively, in a case that the connector 40 is connected to the connector 42, operation data or input data from the second controller 36 are applied to the first controller 34 via the cable 38, and the first controller 34 transmits controller data including the input data from the first controller 34 itself and the input data from the second controller 36 to the game apparatus 12.

In the system here for transmitting the input data from the first controller 34 and the input data from the second controller 36, an amount of the data to be transmitted at a time may sometimes be designed so as not be added, but the microcomputer 94 of the first controller 34 can transmit data by alternately transmitting the angular velocity data from the gyro sensor 85 and the input data from the second controller 36 to the wireless module 76.

Here, if the gyro sensor unit 100 is connected to the conventional first controller as well, data control (alternate output) as described above is performed therein.

In the game system 10, a user first turns the power of the game apparatus 12 on for playing the game (or another application), then selects an appropriate optical disk 66 storing a video game (or another application the player wants to play), and loads the optical disk 66 into the disk drive 54 through the disk slot 18 of the game apparatus 12. In response thereto, the game apparatus 12 starts to execute a video game or another application on the basis of the software stored in the optical disk 66. The user operates the controller 14 in order to apply an input to the game apparatus 12.

FIG. 2 shows one example of an appearance of the first controller 34. FIG. 2(A) is a perspective view of the first controller 34 as seeing it from above rear, and FIG. 2(B) is a perspective view of the first controller 34 as seeing it from below front.

The first controller 34 has a housing 78 formed by plastic molding, for example. The housing 78 is formed into an approximately rectangular parallelepiped shape regarding a back and forth direction (Z-axis direction shown) as a longitudinal direction, and has a size small enough to be held by one hand of a child and an adult. As one example, the housing 78 has a length or a width approximately the same as that of a palm of a person. The player can perform a game operation by means of the first controller 34, specifically, by pushing the buttons provided on it and by changing a position and a direction of the first controller 34 itself.

The housing 78 is provided with a plurality of operation buttons. That is, on the top surface of the housing 78, a cross key 80a, an X button 80b, a Y button 80c, an A button 80d, a select switch 80e, a menu switch 80f, and a start button 80g are provided. Meanwhile, on the bottom surface of the housing 78, a concave portion is formed, and on the reward inclined surface of the concave portion, a B button 80h is provided. Each of the buttons (switches) 80a-80h is assigned an appropriate function depending on a game program to be executed by the game apparatus 12. Furthermore, the housing 78 has a power switch 80i for turning on and off the power of the main body of the game apparatus 12 from a remote place on a top surface. The respective buttons (switches) provided on the first controller 34 may inclusively be indicated as an operating means or an input means with the use of the reference numeral 80.

On the front surface of the housing 78, a light incident opening 78b is formed, and inside the housing 78, an imaged information arithmetic section 81 is further provided. The imaged information arithmetic section 81 is made up of a camera for imaging infrared rays and an arithmetic operation portion for calculating coordinates of imaged objects within an image, and captures an object scene including the above-described markers 22a and 22b by the infrared rays to calculate position coordinates of the markers 22a and 22b within the object scene.

On the rear surface of the housing 78, the above-described connector 42 is provided. The connector 42 is utilized for connecting other equipment to the first controller 34. In this embodiment, the connector 42 is connected with the connector 40 of the second controller 36 or the connector 106 of the gyro sensor unit 100.

Moreover, on the rear surface of the housing 78, a pair of through holes 82a and 82b is formed in such positions as to be symmetrically with each other (X-axis direction) about the connector 42. The pair of through holes 82a and 82b is for being inserted with hooks 112Fa and 112Fb (FIG. 7(A)) to securing the gyro sensor unit 100 at the rear surface of the housing 78. At the rear surface of the housing 78, a through hole 82c for attaching a strap 24 (FIG. 6) is also provided.

When a top surface of the housing 78 is removed, a substrate 34B as shown in FIG. 3 is exposed. That is, the first controller 34 includes the substrate 34B within the housing 78, and at one end of this substrate 34B in the longitudinal direction, the connector 42 described before is attached. On the main top surface of the substrate 34B, the cross key 80a, the X button 80b, the Y button 80c, the A button 80d, the select switch 80e, the menu switch 80f, and the start switch 80g as explained before are assembled.

Furthermore, on the main top surface of the substrate 64, the acceleration sensor 84 as described before is assembled between the cross key 80a and the X button 80b and between the start switch 80g and the select switch 80e, the gyro sensor 85 is arranged between the acceleration sensor 84 and the X button 80b, and the wireless module 76 is arranged at the right of the gyro sensor 85 in the width direction. The various buttons (switches), sensors and modules are connected to the microcomputer 94 (FIG. 13) which constructs a controller circuit by proper wiring (not illustrated).

The acceleration sensor 84 is a three-axis linear accelerometer for detecting a linear acceleration in three-axis directions of X, Y and Z. The gyro sensor 85 is made up of two chips including one-axis gyro sensor 85a and a two-axis gyro sensor 85b. The gyro sensor 85a is for detecting an angular velocity (angular velocity about the Y axis) relating to a yaw angle, and the gyro sensor 85b is detecting two angular velocities (angular velocity about the Z axis and angular velocity about the X axis) relating to a roll angle and a pitch angle. The gyro sensors 85a and 85b are vertically aligned on a main top surface of the substrate 34B. Here, the gyro sensor may be one three-axis gyro sensor or three one-axis gyro sensors.

Here, it is preferable that the direction of the arrangement of the gyro sensor 85 (axial direction) is the same as the direction of the gyro sensor 104 when the gyro sensor unit 100 is connected as described in detail. As to the arrangement position, the gyro sensor is for detecting an angular velocity, and thus, the physical quantity is not changed depending on the position, and therefore, this may be arranged at any positions, for example, at the opposite end of the substrate.

FIG. 4 is an illustrative view showing one example of an appearance of the second controller 36 itself. FIG. 4(A) is a perspective view of the second controller 36 as seeing it from above rear, and FIG. 4(B) is a perspective view of the second controller 36 as seeing it from below front. In FIG. 4, the cable 38 of the second controller 36 is omitted.

The second controller 36 has a housing 86 formed by plastic molding, for example. The housing 86 is formed into an approximately thin long elliptical shape in the forward and backward direction (Z-axis direction) when viewed from plane, and the width of the right and left direction (X-axis direction) at the rear end is narrower than that of the front end. Furthermore, the housing 86 has a curved shape as a whole when viewed from a side, and downwardly curved from a horizontal portion at the front end to the rear end. The housing 86 has a size small enough to be held by one hand of a child or an adult similar to the first controller 34 as a whole, and has a longitudinal length (in the Z-axis direction) slightly shorter than that of the housing 78 of the first controller 34. Even with the second controller 36, the player can perform a game operation by operating buttons and a stick, and by changing a position and a direction of the controller itself.

At the front end of the top surface of the housing 86, an analog joystick 88a is provided. At the end of the housing 86, a front edge slightly inclined backward is provided, and on the front edge, a C button 88b and a Z button 88c are vertically (Y-axis direction in FIG. 4) provided. The analog joystick 88a and the respective buttons 88b and 88c are assigned appropriate functions according to a game program to be executed by the game apparatus 12. The analog joystick 88a and the respective buttons 88b and 88c provided to the second controller 36 may be inclusively denoted by means of the reference numeral 88.

Inside the housing 86 of the second controller 36, an acceleration sensor 90 (FIG. 3) is provided. As the acceleration sensor 90, an acceleration sensor similar to the acceleration sensor 84 in the first controller 34 is applied. More specifically, a three-axis acceleration sensor is applied in this embodiment, and detects accelerations in each of the three axis directions such as an up and down direction (Y-axial direction shown), a right and left direction (X-axial direction shown), and a forward and backward direction (Z-axial direction shown) of the second controller 36. Accordingly, similar to the case of the first controller 34, proper arithmetic process is performed on the detected accelerations to thereby calculate a tilt and a rotation of the second controller 36 and an attitude of the acceleration sensor 90 in the direction of gravity. Furthermore, it is possible to calculate a motion applied to the first controller 34 by swinging, etc. as with the case of the second controller 36.

Figure 5:
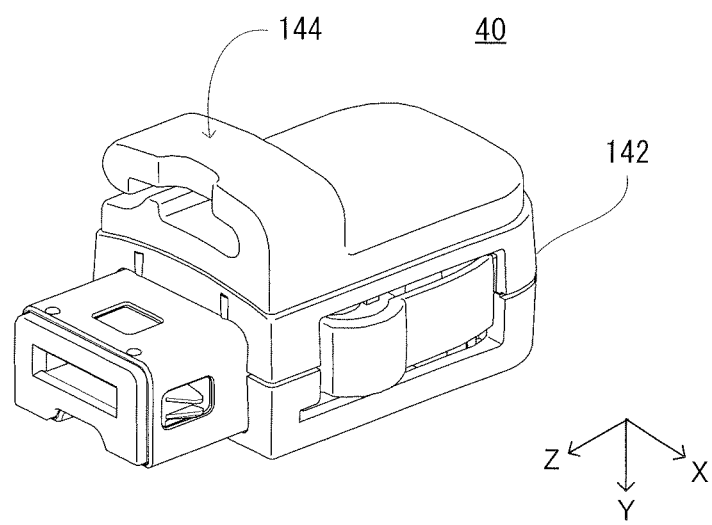
FIG. 5 is an illustrative view showing an appearance of a connector of the second controller.
Figure 6:
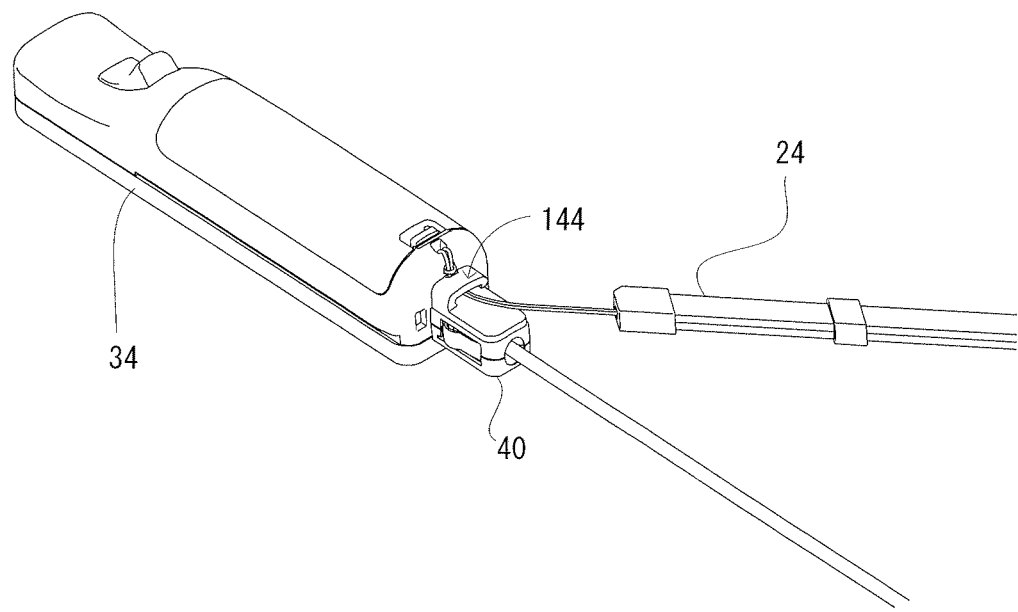
FIG. 6 is an illustrative view showing a manner in which a cord of a strap attached to the first controller is hung and retained with a hook of the connector in a state that the connector of the second controller is connected the first controller.

FIG. 5 shows one example of an appearance of the connector 40 of the second controller 36. FIG. 5 is a perspective view of the connector 40 as seeing it from below front. Here also, the cable 38 is omitted. The connector 40 has a housing 142 formed by a plastics molding, for example. At the bottom surface of the housing 142, a hook 144 is provided. The hook 144 is for intrinsically hanging and retaining a cord of the strap 24 attached to the first controller 34 when the connector 40 is directly connected to the first controller 34 (or the connector 42) as shown in FIG. 6. By hanging and retaining the cord of the strap 24 on the hook 144, the connectors are more securely fixed.

FIG. 7 shows one example of an appearance of the gyro sensor unit 100. FIG. 7(A) is a perspective view of the gyro sensor unit 100 as seeing it from above front, and FIG. 7(B) is a perspective view of the gyro sensor unit 100 as seeing it from rear back.

The gyro sensor unit 100 has a housing 110 formed by a plastics molding, for example. The housing 110 has an appropriately rectangular parallelepiped shape, has a length ⅕ of the length of the housing 78 of the first controller 34, and has a width and a thickness approximately the same as those of the housing 78. The player can play a game operation by changing a position and a direction of the first controller 34 itself even if the first controller 34 is attached with the gyro sensor unit 100.

On the front surface and the rear surface of the housing 110, the above-described connectors 106 and 108 are respectively provided, on the side surfaces of the housing 110, a pair of release buttons 112a and 112b are provided, and the bottom surface of the housing 110, a lock switch 114 is provided. An approximately sphere concave portion 110a is provided from the end of the front surface of the housing 110 to the bottom surface such that the through hole 82c for the strap 24 is exposed in a state that the first controller 34 is attached with the gyro sensor unit 100 (FIG. 9).

The pair of release buttons 112a and 112b, and a pair of hooks 112Fa and 112Fb which are respectively associated with the release buttons 112a and 112b are provided on a front surface of the housing 110 at positions symmetrically with each other in a horizontal direction (X-axis direction) about the connector 106. When the connector 106 is connected to the connector 42 in order to attach the gyro sensor unit 100 to the first controller 34, the pair of hooks 112Fa and 112Fb are inserted to the pair of through holes 82a and 82b (FIG. 2(A)) at the rear surface of the housing 78 such that the pawls of the hooks 112Fa and 112Fb are engaged with the inner wall of the housing 78. Thus, the gyro sensor unit 100 is fixed to the rear surface of the first controller 34.

Figure 9:
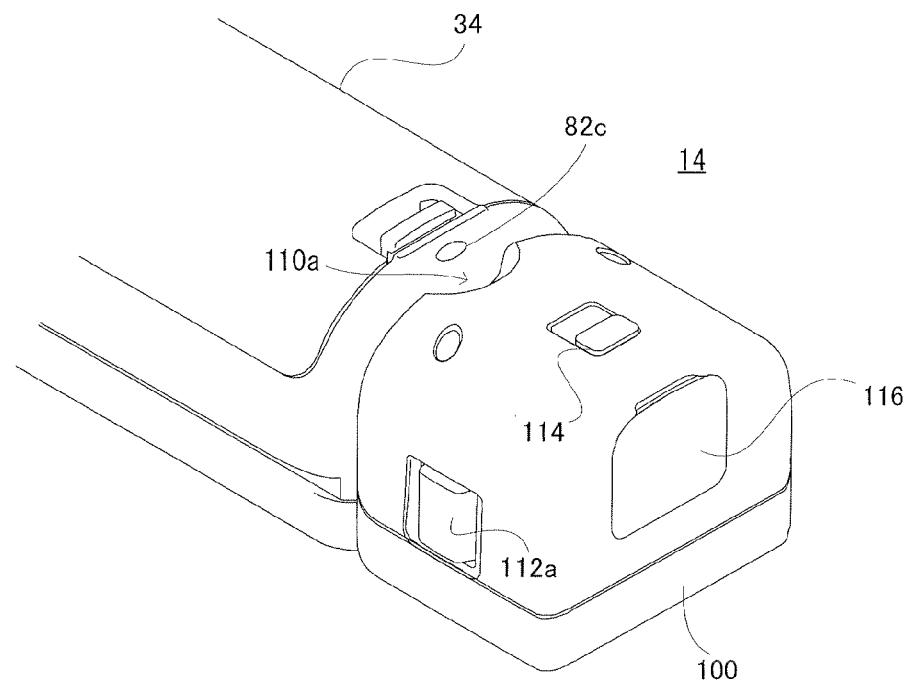
FIG. 9 is an illustrative view showing a state that the gyro sensor unit is attached to the first controller.

FIG. 9 shows the gyro sensor unit 100 thus attached to the first controller 34. When the pair of release buttons 112a and 112b are pushed in this state, the engagement of the pawls are released to allow the gyro sensor unit 100 to be detached from the first controller 34.

A lock switch 114 is a sliding switch for locking such the release buttons 112a and 112b. The release buttons 112a and 112b cannot be pushed (locked state) when the lock switch 114 is in a first position (toward the rear side, for example), and the release buttons 112a and 112b can be pushed (released state) when the lock switch 114 is in a second position (toward the front, for example). Within the housing 110, locking springs 118a and 118b (FIG. 8) are provided and constructed so as to be repulsed when the release button 112a and 112b are pushed, and so as to maintain the engaged state when the release button 112a and 112b are not pushed. Thus, in order to remove the gyro sensor unit 100, the user has to push the release buttons 112a and 112b after sliding the lock switch 114 from the first position to the second position.

On the rear surface of the housing 110, a concave portion 110b capable of housing the connector cover 116 to be attached to the connector 108 is provided on the periphery of the connector 108. The connector cover 116 has a narrow thin (that is, can be bended) protrusion 116a extending in a forward and backward (Z-axis direction) direction on the one end of the main surface. The end portion of the protrusion 116a is engaged with the housing 110, and the connector cover 116 is captive from the housing 110 even in a state that it is removed from the connector 108.

Figure 10:
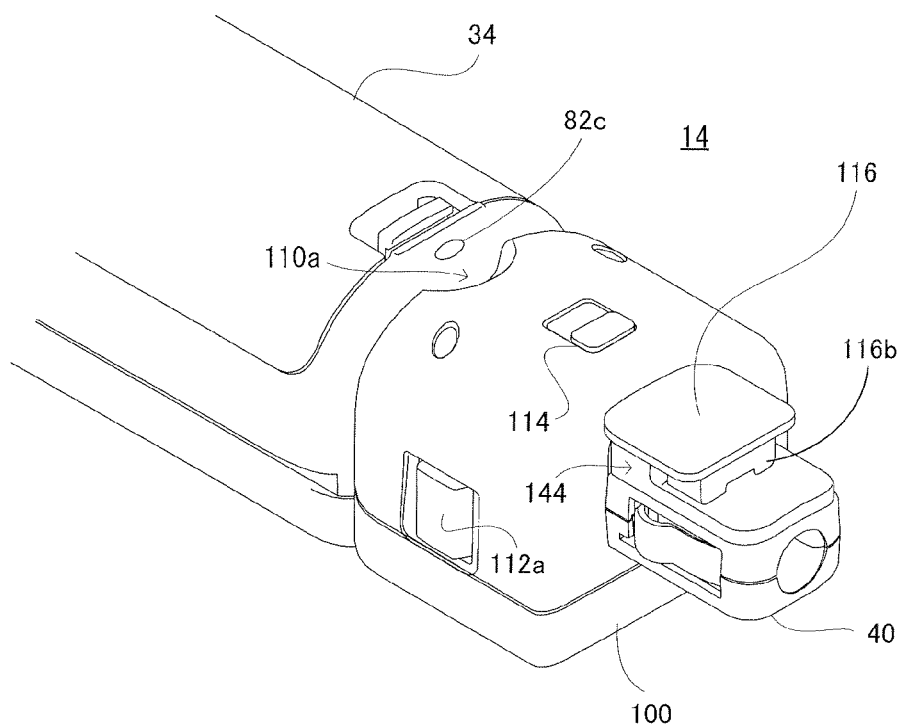
FIG. 10 is an illustrative view showing a state that the second controller is connected to the first controller via the gyro sensor.

The connector cover 116 has a narrow thick (that is, is hard to bend) protrusion 116b extending in a right and left direction (X-axis direction) on the other end of the main surface. The thickness (height of the Z-axis direction) of the protrusion 116b is approximately the same as the thickness (height of the Y-axis direction) of the hook 144 (FIG. 5) provided to the connector 40 of the second controller 36. In a case that the second controller 36 is connected to the first controller 34 via the gyro sensor unit 100, the main surface of the connector cover 116 is made level to be engaged with the side surface of the hook 144 of the protrusion 116b as shown in FIG. 10.

Figure 8:
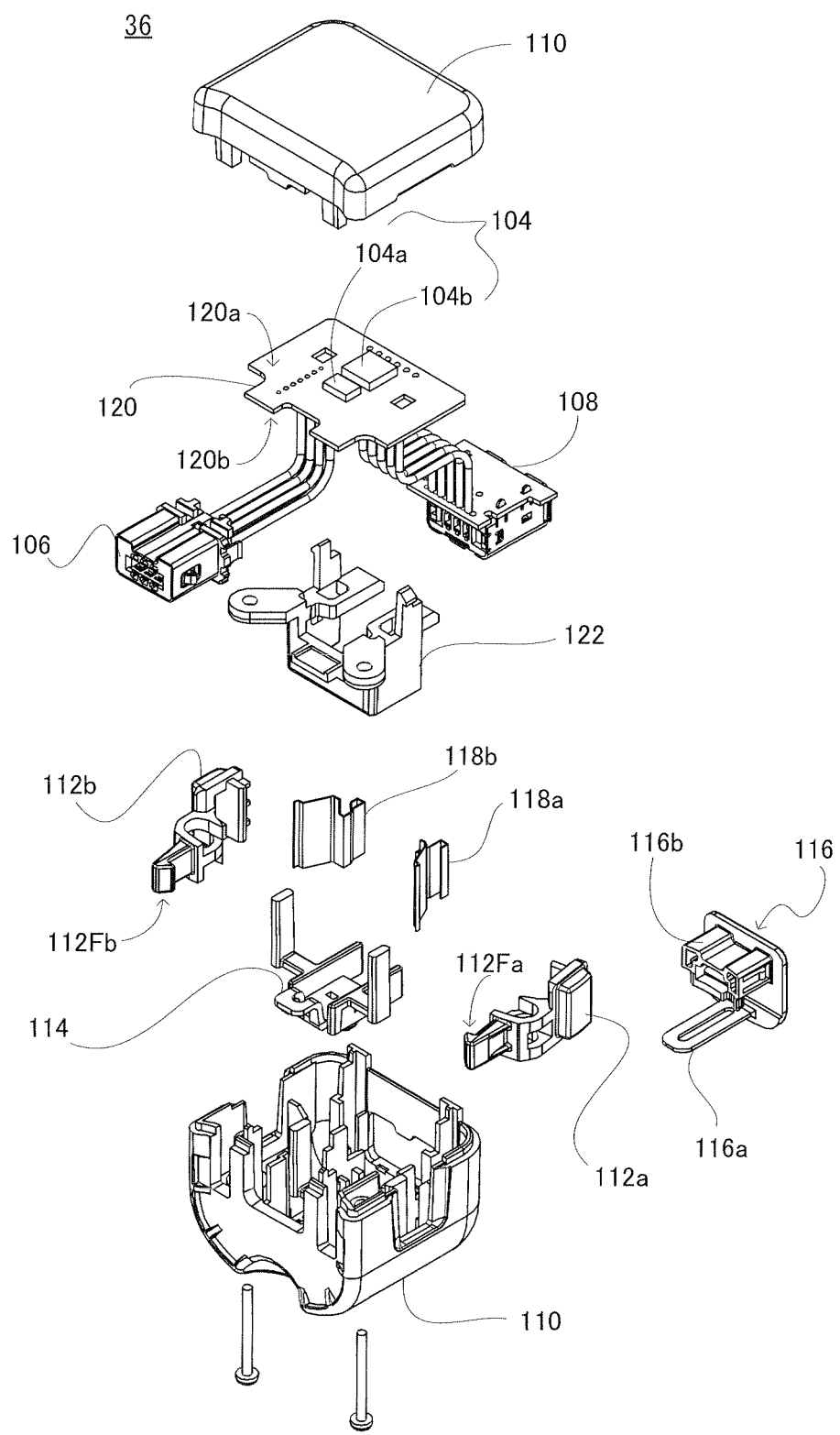
FIG. 8 is an illustrative view showing a configuration of the gyro sensor unit.

FIG. 8 shows one example of a structure of the gyro sensor unit 100. The gyro sensor unit 100 also has a gyro substrate 120 and a support member 122 in addition to the above-described housing 110, connectors 106 and 108, release buttons 112a and 112b, hooks 112Fa and 112Fb, lock switch 114, connector cover 116 and locking springs 118a and 118b. The gyro substrate 120 is connected to each of the connectors 106 and 108 by a signal wire, and the support member 122 supports the gyro substrate 120 and the connectors 106 and 108.

The gyro substrate 120 is provided with a gyro sensor 104. The gyro sensor 104 is made up of two chips including one-axis gyro sensor 104a and two-axis gyro sensor 104b. The gyro sensor 104a is for detecting an angular velocity relating to a yaw angle (angular velocity about the Y axis), and the gyro sensor 104b is for detecting two angular velocities relating to a roll angle and a pitch angle (angular velocity about the Z axis and angular velocity about the X axis). The gyro sensors 104a and 104b are arranged horizontally on a top surface 120a of the gyro substrate 120.

Here, the arrangement of the gyro sensors 104a and 104b is not restricted to that shown in FIG. 8. In another embodiment, the gyro sensor 104a is horizontally provided on one of the top surface 120a and the bottom surface 120b of the gyro substrate 120 while the gyro sensor 104b is horizontally provided on the other of the top surface 120a and the bottom surface 120b of the gyro substrate 120 so as to be opposed to the gyro sensor 104a with the gyro substrate 120 therebetween. In another embodiment, the gyro sensor 104a is vertically provided on one of the top surface 120a and the bottom surface 120b of the gyro substrate 120 while the gyro sensor 104b is horizontally provided on the other of the top surface 120a and the bottom surface 120b of the gyro substrate 120.

Furthermore, the gyro sensor 104 is not restricted to be made up of two chips, may be made up of three one-axis gyro sensors (three chips), or may be made up of one three-axis gyro sensor (one chip). In either case, a position and a direction of each of the chips are decided so as to properly detect the above-described three angular velocities. In addition, under certain circumstances, the gyro sensor 104 may be made up of one two-axis gyro sensor, or may be mad up of one or two one-axis gyro sensor.

This modified example may be applied to the gyro sensor 85 integrated in the first controller 34.

It should be noted that the shapes of the first controller 34 shown in FIG. 2, the second controller 36 shown in FIG. 4, the connector 40 shown in FIG. 5, and the gyro sensor unit 100 shown in FIG. 7, and the shape, the number and the setting position of the button (switch or stick, etc.) are merely one example, and may be changed to another shape, number and setting position, etc. as necessary.

Here, the sensor is a gyro sensor (angular velocity sensor) in a preferred embodiment, but may be other motion sensors, such as an acceleration sensor, a velocity sensor, a displacement sensor, a rotation angle sensor, etc. Other than the motion sensors, there are a slant sensor, an image sensor, an optical sensor, a pressure sensor, a magnetic sensor, a temperature sensor, etc., and in a case that either sensor is added, an operation by utilizing an object to be detected of the sensor is made possible. In a case that either sensor is utilized, the sensor can be added to the operating device while another device conventionally connected to the operating device is utilized as it is.

In addition, the power source of the controller 14 is applied by a battery (not illustrated) which is replaceably accommodated in the first controller 34. The power is supplied to the second controller 36 via the connector 40 and the cable 38. If the gyro sensor unit 100 is connected to the first controller 34, the power is supplied to the gyro sensor unit 100 via the connectors 42 and 106. Alternatively, if the second controller 36 is connected to the gyro sensor unit 100, a part of the power supplied from the first controller 34 to the gyro sensor unit 100 is also applied to the second controller 36 via the connector 108, the connector 40 and the cable 38.

Figure 11:
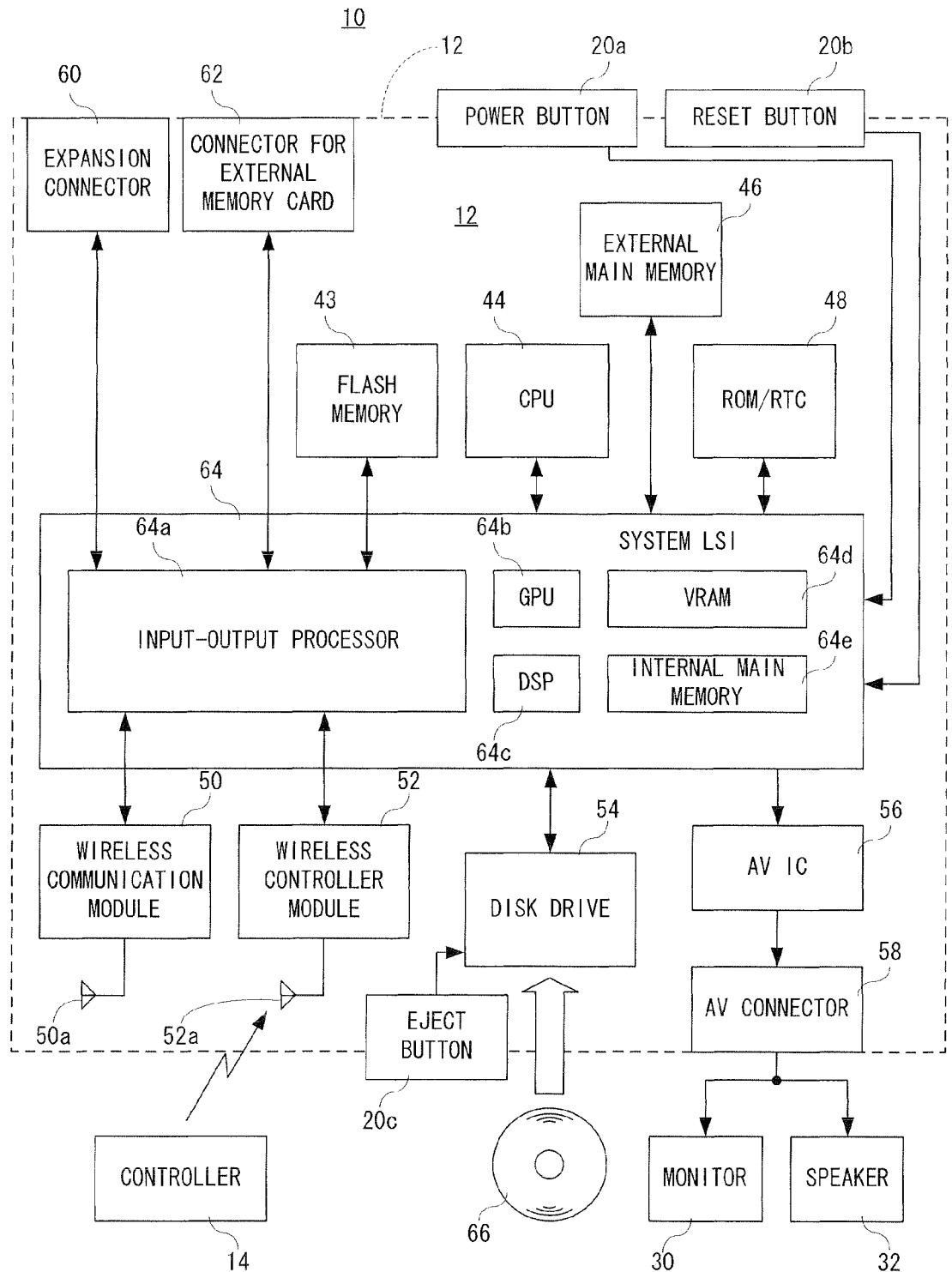
FIG. 11 is a block diagram showing an electric configuration of FIG. 1 embodiment.

FIG. 11 shows a block diagram showing an electric configuration of the video game system 10. Although illustration is omitted, respective components within the housing 16 are mounted on the printed-circuit board. As shown in FIG. 11, the game apparatus 12 is provided with a CPU 44 functioning as a game processor. Furthermore, the CPU 44 is also connected with a system LSI 64. The system LSI 64 is connected with an external main memory 46, a ROM/RTC 48, a disk drive 54 and an AV IC 56.

The external main memory 46 is utilized as a work area and a buffer area of the CPU 44 by storing programs such as a game program, etc. and various data. The ROM/RTC 48, which is a so-called boot ROM, is incorporated with a program for activating the game apparatus 12, and is provided with a time circuit for counting a time. The disk drive 54 reads program, texture data, etc. from the optical disk 66, and writes them in an internal main memory 64e described later or the external main memory 46 under the control of the CPU 44.

The system LSI 64 is provided with an input-output processor 64a, a GPU (Graphics Processor Unit) 64b, a DSP (Digital Signal Processor) 64c, a VRAM 64d and an internal main memory 64e, and these are connected with one another by internal buses although illustration is omitted.

The input-output processor (I/O processor) 64a executes transmission and reception of data and executes download of the data.

The GPU 64b is made up of a part of a drawing means, and receives a graphics command (construction command) from the CPU 44 to generate game image data according to the command. Additionally, the CPU 44 applies an image generating program required for generating game image data to the GPU 64b in addition to the graphics command.

Although illustration is omitted, the GPU 64b is connected with the VRAM 64d as described above. The GPU 64b accesses the VRAM 64d to acquire data (image data: data such as polygon data, texture data, etc.) required to execute the construction command. Here, the CPU 44 writes image data required for drawing to the VRAM 64d via the GPU 64b. The GPU 64b accesses the VRAM 64d to produce game image data for drawing.

In this embodiment, a case that the GPU 64b generates game image data is explained, but in a case of executing an arbitrary application except for the game application, the GPU 64b generates image data as to the arbitrary application.

Furthermore, the DSP 64c functions as an audio processor, and generates audio data corresponding to a sound, a voice, music, or the like to be output from the speaker 32 by means of the sound data and the sound wave (tone) data stored in the internal main memory 64e and the external main memory 46.

The game image data and audio data which are generated as described above are read by the AV IC 56 and output to the monitor 30 and the speaker 32 via the AV connector 58. Accordingly, a game screen is displayed on the monitor 30, and a sound (music) necessary for the game is output from the speaker 32.

Furthermore, the input-output processor 64a is connected with a flash memory 43, a wireless communication module 50 and a wireless controller module 52, and is also connected with an expansion connector 60 and a connector for external memory card 62. In addition, the wireless communication module 50 is connected with an antenna 50a, and the wireless controller module 52 is connected with an antenna 52a.

The input-output processor 64a can communicate with other game apparatuses and various servers to be connected to a network (not shown) via the wireless communication module 50. It should be noted that it is possible to directly communicate with another game apparatus without going through the network. The input-output processor 64a periodically accesses the flash memory 43 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 64a receives data (referred to as received data) transmitted from another game apparatuses via the network, the antenna 50a and the wireless communication module 50, and stores the received data in the flash memory 43. In a case that the received data does not satisfy a constant condition, the received data is abandoned as it is. In addition, the input-output processor 64a receives data (download data) downloaded from the download server (not shown) via the network, the antenna 50*a* and the wireless communication module 50, and stores the download data in the flash memory 43.

Furthermore, the input-output processor 64*a* receives input data transmitted from the controller 14 via the antenna 52*a* and the wireless controller module 52, and (temporarily) stores it in the buffer area of the internal main memory 64*e* or the external main memory 46. The input data is erased from the buffer area after being utilized in the processing by the CPU 44 (game processing, for example).

In this embodiment, as described above, the wireless controller module 52 makes communications with the controller 14 in accordance with the Bluetooth standard. This makes it possible for the game apparatus 12 to not only acquire data from the controller 14 but also to transmit a predetermined command to the controller 14 and control a motion of the controller 14 from the game apparatus 12.

In addition, the input-output processor 64*a* is connected with the expansion connector 60 and the connector for external memory card 62. The expansion connector 60 is a connector for interfaces, such as USB, SCSI, etc., and capable of connecting medium such as an external storage and peripheral devices such as another controller different form the controller 14. Furthermore, by connecting the expansion connector 60 with a cable LAN adaptor, the cable LAN can be utilized in place of the wireless communication module 50. The connector for memory card 62 can be connected with an external storage like a memory card 38. Thus, the input-output processor 64*a*, for example, accesses the external storage via the expansion connector 60 and the connector for external memory card 62 to store and read the data in and from the same.

Although detailed explanation is omitted, the game apparatus 12 (housing 16) is provided with the power button 20*a*, the reset button 20*b* and the eject button 20*c* as shown in Figure as well. The power button 20*a* is connected with the system LSI 64. When the power button 20*a* is turned on, the system LSI 64 is set to a mode of a normal energized state in which the respective components of the game apparatus 12 are supplied with power through an AC adapter not shown.

The reset button 20*b* is also connected with the system LSI 64. When the reset button 20*b* is pushed, the system LSI 64 activates a started-up program of the game apparatus 12. The eject button 20*c* is connected to the disk drive 54. When the eject button 20*c* is pushed, the optical disk 66 is ejected from the disk drive 54.

FIG. 13 shows one example of an overall electric configuration of the controller 14 when the first controller 34 and the second controller 36 are connected (without interposing the gyro sensor unit 100). The first controller 34 includes the wireless communication module 76 therein, and the wireless communication module 76 is connected with the operating portion 80 and the acceleration sensor 84. The wireless communication module is connected to a serial bus 95 being a common bus, and the serial bus 95 is connected with the imaged information arithmetic section 81, other devices, such as a memory 96, etc. Here, the memory 96 is constructed by an EEPROM, for example, and stores device information of the first controller, and a program, data, etc. for operating the wireless communication module 76, the microcomputer 94, etc. The serial bus 95 can utilize a serial bus like I2C, etc., for example.

Via a switch SW1 and the microcomputer 94 which are arranged in parallel with each other (moreover, through the connectors 42 and 40 and the cable 38), a microcomputer 89 of the second controller 36 is connected to one end of the serial bus 95. The former microcomputer 94 is connected with the gyro sensor 85, and the latter microcomputer 89 is connected with the operating portion 88 and the acceleration sensor 90.

Each device connected to the serial bus 95 is assigned an address on the serial bus 95. In this embodiment, a #1 address, a #2 address, and a #3 address, a #4 address are assigned to the imaged information arithmetic section 81, the memory 96, the microcomputer 94, and the microcomputer 89, respectively. Here, the #3 address is a special address used only for a call control (see FIG. 21, FIG. 22 and FIG. 23) for calling a gyro function, and the #4 address being a normal address is assigned to an arbitrary expansion device in the main control (see FIG. 21, FIG. 24).

Accordingly, a state in which the #4 address is assigned to the microcomputer 94 is a state that the integrated gyro sensor 85 is activated, that is, corresponds to the gyro mode or the gyro & second controller mode, and a state in which the #3 address is assigned to the microcomputer 94 is a state that the integrated gyro sensor 85 is in a sleep mode, that is, corresponds to the standby mode or the bypass mode. Here, the gyro mode is a mode in which a gyro function is used, and the second controller is not connected. The gyro & second controller mode is a mode in which both of the gyro function and the second controller are used. Furthermore, the standby mode is a mode in which the gyro function is not used, and the second controller is not connected. The bypass mode is a mode in which the gyro function is not used, and the second controller is used. Depending on the presence or absence of utilization the gyro function and the presence or absence of utilization the second controller, control can be performed among the aforementioned four modes.

Thus, in the gyro & second controller mode, the plurality of microcomputers each of which is assigned the #4 address as an address, that is, the microcomputer 94, the microcomputers 102 and/or 89 are in a state of being connected to the serial bus 95. In this case, each microcomputer can be identified on the basis of gyro/second controller identifying information (see FIG. 17).

The wireless module 76 is connected to the microcomputer 94 by an Attach pin, and the microcomputer 94 is connected to the connector 42 by an Attach pin. The wireless module 76 can know whether or not the connector 42 is connected with the device, such as the gyro sensor unit 100, the second controller 36, etc. with reference to the value of Attach.

The switch SW1 is turned on (Connect) in a mode in which the gyro sensor 85 is not used (standby mode or bypass mode) under the control of the microcomputer 94, and is turned off (Disconnect) in a mode in which the gyro sensor 85 is used (gyro mode or gyro & second controller mode) (see FIG. 19(A)).

The operating portion 80 indicates the above-described operation buttons or operation switches 80*a*-80*i*. When the operating portion 80 is operated, data indicating the operation is output to the wireless communication module 76. Data indicating the acceleration detected by the acceleration sensor 84 is also output to the wireless communication module 76. The acceleration sensor 84 has a sampling period being in the order of 200 frames per second at the maximum, for example.

From the imaged information arithmetic section 81, data indicating position coordinates within the image obtained by imaging the markers 22*a* and 22*b* is output to the wireless communication module 76 through the serial bus 95. The gyro sensor 85 indicates the above-described gyro sensors 85*a* and 85*b*, and has a sampling period similar to that of the acceleration sensor 84, for example. The microcomputer 94 outputs data indicating the angular velocity detected by the gyro sensor 85 to the wireless communication module 76 through the serial bus 95.

The operating portion 88 shows the above-described stick 88a and operation buttons 88b, 88c. When the operating portion 88 is operated, in a case that the switch SW1 is turned on, the data indicating the operation (operation data) is output to the wireless communication module 76 from the microcomputer 89 through the serial bus 95. On the other hand, in a case that the switch SW1 is turned off, the operation data is applied to the microcomputer 94 through the serial bus 95, and the microcomputer 94 outputs the operation data to the wireless communication module 76 through the serial bus 95.

Furthermore, the acceleration sensor 90 has a sampling period similar to that of the acceleration sensor 84. Thus, the data indicating the acceleration thus detected is also output to the wireless communication module 76 through a bypass on the side of the switch SW1 by the microcomputer 89 in a case that the switch SW1 is turned on, and output to the wireless communication module 76 via the microcomputer 94 when the switch SW1 is turned off, similar to the case of the operation data.

Here, each output to the above-described wireless communication module 76 is executed at a cycle of 1/200 seconds, for example. Accordingly, during arbitrary 1/200 seconds, operation data from the operating portion 80, position coordinate data from the imaged information arithmetic section 81, acceleration data from the acceleration sensor 84, angular velocity data from the gyro sensor 85, operation data from the operating portion 88, and acceleration data from the acceleration sensor 90 are output to the communication unit 76 once for each of them.

Out of the above-described components of the first controller 34, the switch SW1 and the gyro sensor 85 are added to the conventional first controller, and the microcomputer 94 control them to thereby add the gyro function to the first controller 34. An important part being made up of the switch SW1, the gyro sensor 85 and the microcomputer 94 is called a "gyro controller 85C" below.

FIG. 14 shows one example of an overall electric configuration of the controller 14 when the first controller 34 and the second controller 36 are connected via the gyro sensor unit. The gyro sensor unit 100 includes a gyro controller 104C. The gyro controller 104C is made up of a switch SW2, the gyro sensor 104 and the microcomputer 102. The gyro sensor 104 shows the above-described gyro sensors 104a and 104b, and has a sampling period similar to that of the acceleration sensor 84, for example.

As a natural operation, the microcomputer 102 turns the switch SW2 on (Connect) to place the gyro sensor in a sleep state in the standby mode or the bypass mode, and turns the switch SW2 off (Disconnect) to output the data indicating the angular velocity detected by the gyro sensor 104 to the wireless communication module 76 through the serial bus 95 in the gyro mode or the gyro & second controller mode.

However, in this embodiment, the switch SW2 and the microcomputer 102 which are arranged in parallel with each other are interposed between the first controller 34 (the microcomputer 94 thereof) and the second controller 36 (the microcomputer 89 thereof) (on the serial bus 95). The microcomputer 94 controls the switch SW2 and the gyro sensor 104 through the microcomputer 102 to cause the switch SW2 to be placed in an initial state, that is, in an ON (Connect) state irrespective of the modes as shown in FIG. 20 and cause the gyro sensor 104 to be placed in the sleep mode (power off state) irrespective of the modes.

FIG. 15 shows an important part of the first controller, that is, a configuration of the gyro controller 85C shown in FIG. 13 or FIG. 14. Each of the above-described connector 42, connector 106, connector 108 and connector 40 is a connector of six pins, for example, in which an Attach pin for controlling a variable "Attach" indicating a connected state between the connectors is included. The Attach pin is changed between "Low" indicating that the connectors are not connected, and "High" indicating that the connectors are connected. Specifically, the Attach pin on the side of the wireless module 76 is called an "Attach1", and the Attach pin on the side of the connector 42 is called an "Attach2" when seen from the microcomputer 94.

The other two pins out of the aforementioned six pins are assigned the serial bus 95, and the gyro controller 85C further includes a bus switch SW1 for making connection/isolation between the serial bus 95 on the side of the wireless module 76 and the serial bus 95 on the side of the connector 42.

The microcomputer 94 includes two kinds of A/D conversion circuits 94a and 94b. Angular velocity signals about the three axes output from the gyro sensor 85 are applied to each of the A/D conversion circuits 94a and 94b. In the A/D conversion circuit 94a, A/D converting processing of a high angular velocity mode for regarding all the detection range by the gyro sensor 85 (±360°/sec) as a target, for example, is executed, and in the A/D conversion circuit 94b, A/D converting processing of a low angular velocity mode for regarding a part of the detection range by the gyro sensor 85 (±90°/sec, for example) as a target is executed. The microcomputer 94 outputs any one of the two kinds results of the A/D conversion as angular velocity data.

More specifically, when two kinds of angular velocity data corresponding to a certain time are output from the A/D conversion circuits 94a and 94b, the microcomputer 94 first determines whether or not with respect to the angular velocity data of the low angular velocity mode, the value A falls within the range of a first threshold value Th1 to a second threshold value Th2(>Th1), that is, a condition "Th1<A<Th2" is satisfied, for each of the axis, that is, the yaw axis, the roll axis, and the pitch axis. Next, on the basis of these three determination results, any one of the low angular velocity mode and the high angular velocity mode is selected. For example, with respect to each of the three determination results, if "YES", the low angular velocity mode is selected for each axis, and if "NO", the high angular velocity mode is selected for each axis. Then, the angular velocity data according to the mode selected for each axis is output along with the mode information indicating the selected mode. That is, by changing accuracy of the data depending on the angular velocity, it is possible to output data with high accuracy at low speeds even if the data amount is equal.

FIG. 16 shows an important part of the gyro sensor unit 100, that is, the gyro controller 104C shown in FIG. 14. The configuration of the gyro controller 104C is roughly equivalent to the configuration of the gyro controller 85C as described above except for the content of the control of the microcomputer. Here, in the gyro controller 104C, an Attach1 and an Attach2 are on the side of the first controller 34 (microcomputer 94) and on the side of the second controller 36 (microcomputer 89), respectively when seen from the microcomputer 102.

FIG. 17 shows a data format handled by the gyro controller 85C in the first controller 34 (output from the microcomputer 94 to the wireless module 76). FIG. 17(A) shows a data format for gyro, and FIG. 17(B) shows a data format for second controller. Here, these formats are common to that of the data dealt by the gyro controller 104C in the gyro sensor unit 100.

As shown in FIG. 17(A), the data for gyro includes yaw angular velocity data, roll angular velocity data and pitch angular velocity data, and yaw angular velocity mode information, roll angular velocity mode information and pitch angular velocity mode information, and second connector connection information and gyro/second controller identifying information.

The yaw angular velocity data, the roll angular velocity data and the pitch angular velocity data, each of which is 14 bits data, for example, are respectively obtained by performing an A/D conversion on a yaw angular velocity signal, a roll angular velocity signal and a pitch angular velocity signal which are output from the gyro sensor 104. The yaw angular velocity mode information, the roll angular velocity mode information and the pitch angular velocity mode information each is information of one bit indicating a corresponding mode of each of the angular velocity data, and changed between "0" corresponding to the high angular velocity mode and "1" corresponding to the low angular velocity mode.

The second controller connection information is information of one bit for indicating whether or not the connector 42 or 108 is connected to the second controller 36, and is changed between "0" indicating a non-connection and "1" indicating a connection. The gyro/second controller identifying information is information of one bit for identifying whether the data is data output from the gyro sensor 85 or 104 or the data output from the second controller 36, and is changed between "1" indicating that this is from the gyro sensor 85 or 104 and "0" indicating that this is from the second controller 36.

On the other hand, the data from the second controller includes X stick operation data and Z stick operation data respectively indicating a stick operation in the right and left direction (X-axis direction) and a stick operation in the forward and reward direction (Z-axis direction), and X acceleration data, Y acceleration data and Z acceleration data respectively indicating an acceleration in the X-axis direction, an acceleration in the Y-axis direction and an acceleration in the Z-axis direction, and button operation data, second connector connection information, and gyro/second controller identifying information.

In the first controller 34, the microcomputer 94 alternately outputs data for gyro according to the format shown in FIG. 17(A) and data for second controller according to the format shown in FIG. 17(B) to the wireless module 76 at a cycle of 1/200 seconds, that is, at a cycle of 1/100 seconds as to the one format. This is much shorter than the cycle of 1/60 seconds as a general processing period for game processing, etc., and therefore, even if the data is alternately output, both of the data can be simultaneously used for one frame in the game processing.

The wireless module 76 includes a microcomputer 76C, a memory 76R, etc., and transmits obtained data to the game apparatus 12 via the antenna 98 and receives data from the game apparatus 12 via the antenna 98 by using the memory 76R as a memory area (working area and buffer area) under the control of the microcomputer 76C.

The data output from the microcomputer 94 to the wireless module 76 is temporarily stored in the memory 76R through the microcomputer 76C. The data output from the operating portion 80, the imaged information arithmetic section 81 and the acceleration sensor 84 within the first controller 34 to the wireless module 76 are also temporarily stored in the memory 76R. The microcomputer 76C outputs the data stored in the memory 72R to the wireless module 76 as controller data when a transmission timing to the game apparatus 12 has come.

The controller data includes the data for first controller shown in FIG. 18 (A) in addition to the data for gyro shown in FIG. 17(A) and/or the data for second controller shown in FIG. 17(B). The data for first controller includes X acceleration data, Y acceleration data and Z acceleration data based on an output from the acceleration sensor 84, position coordinate data based on an output from the imaged information arithmetic section 81, and button operation data based on an output from the operating portion 80.

The wireless module 76 modulates a carrier at a predetermined frequency by the controller data, and emits its weak radio wave signal from the antenna 98 by using a short-range wireless communication technique, such as Bluetooth (trademarks). Namely, the controller data is modulated to the weak radio wave signal by the wireless module 76 and transmitted from the first controller 34. The weak radio wave signal is received by the wireless controller module 52 of the game apparatus 12. The weak radio wave thus received is subjected to demodulating and decoding processing, so that the game apparatus 12 can obtain the controller data. The CPU 44 of the game apparatus 12 performs the game processing on the basis of the controller data obtained from the controller 14. Here, the wireless communication between the first controller 34 and the game apparatus 12 may be executed according to another standard, such as a wireless LAN, etc without being restricted to the short distance wireless communication.

Figure 12:
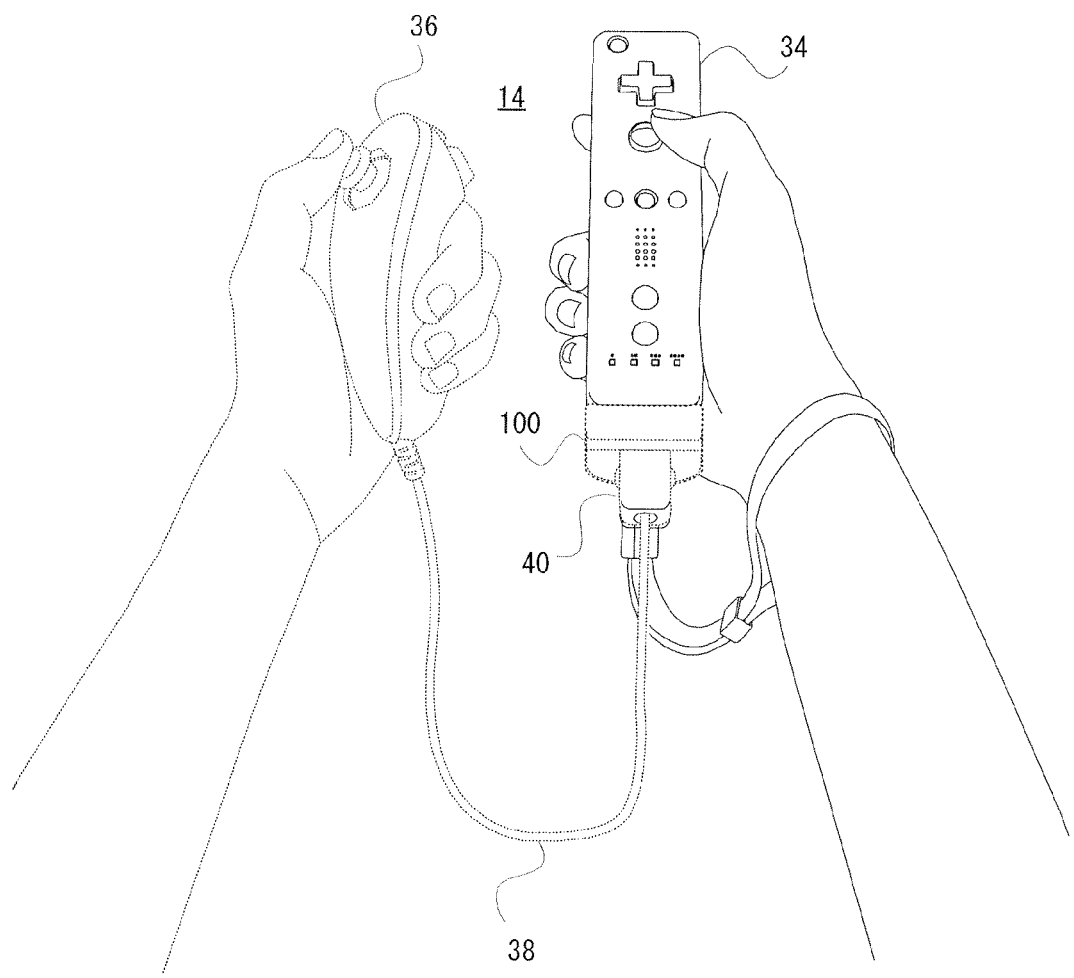
FIG. 12 is an illustrative view showing a situation in which a player operates the controllers.

In this game system 10 configured as described above, a user can make an input to an application like a game, or the like by moving the controller 14 itself other than execution of a button operation. In playing the game, for example, the user holds the first controller 34 (specifically, holding portion 78a of the housing 78: FIG. 2) with the right hand and the second controller 36 with the left hand as shown in FIG. 12. As described above, the first controller 34 includes the acceleration sensor 84 for detecting accelerations in the three-axis directions, and the second controller 36 also includes the similar acceleration sensor 90. The first controller 34 further includes the gyro sensor 85 for detecting an angular velocity about the three-axes. When the first controller 34 and the second controller 36 are moved by the player, acceleration values in the three-axis directions indicating the movements of the first controller itself and angular velocity value about the three-axes are detected by the acceleration sensor 84 and the gyro sensor 85, and acceleration values in the three-axis directions indicating the movement of the second controller itself are detected by the acceleration sensor 90.

These detected values are transmitted to the game apparatus 12 in a form of the aforementioned controller data. In the game apparatus 12 (FIG. 11), the controller data from the controller 14 is received by the input-output processor 64a via the antenna 52a and the wireless controller module 52, and the received controller data is written to a buffer area of the internal main memory 64e or the external main memory 46. The CPU 44 reads the controller data stored in the buffer area of the internal main memory 64e or the external main memory 46, and restores the detected values, that is, the values of the acceleration and/or the angular velocity detected by the controller 14 from the controller data.

Here, the angular velocity data has two modes of the high angular velocity mode and the low angular velocity mode, and therefore, the two kinds of angular velocity restoring algorithms corresponding to the two kinds are prepared. In restoring the angular velocity value from the angular velocity data, the angular velocity restoring algorithm corresponding to the mode of the angular velocity data is selected on the basis of the angular velocity mode information.

The CPU 44 can further perform game processing on the basis of the acquired angular velocity and acceleration. For example, the CPU 44 calculates an attitude on the basis of the angular velocity and the acceleration to thereby perform the game processing based on the attitude. More specifically, by updating an attitude of the input device based on the angular velocity, an attitude can be calculated, and by the acceleration, the attitude can be corrected. Furthermore, it is possible to perform the game processing on the basis of a swing of the input device.

By the way, some games may be a game for single controller of utilizing only the first controller 34, and other games may be a game for two controllers of utilizing the first controller 34 and the second controller 36. The first controller 34 being a main controller is required for playing all the games whereas the second controller 36 being an expansion controller is connected to the first controller 34 when the game for two controllers is played, and is removed in general when the game for single controller is played.

On the other hand, the gyro sensor unit 100 is an expansion sensor or the expansion controller for the conventional first controller as described before and is not to be connected to the first controller 34 of this embodiment. However, the gyro sensor unit 100 and the first controller 34 of this embodiment have the connectors the same in shape, and therefore, the gyro sensor unit 100 may erroneously be connected. In addition, the second controller 36 may be connected to the first controller 34 via the gyro sensor unit 100.

An outline of a mode control by the gyro controller 85C of the first controller 34 is shown in FIG. 19. FIG. 19(A) shows a table in which controlled objects by the gyro controller 85C are described, and FIG. 19(B) shows each of the transitions by the gyro controller 85C. Here, the table is stored in the memory 94c, for example. As shown in FIG. 19, the modes prepared in the gyro sensor unit 100 are the aforementioned four kinds, "standby", "bypass", "gyro" and "gyro & second controller".

Referring to FIG. 19(A), the controlled object by the gyro controller 85C includes a "gyro function", a "gyro power source", a "bus switch", an "Attach1" and a "bus address", etc. The gyro function is placed in a stopped state (No Active) in each of the standby mode and the bypass mode, and is placed in a start-up state (Active) in each of the gyro mode and the gyro & second controller mode. A power supply to the gyro power source, that is, the gyro sensor 85 is stopped (OFF) in each of the standby mode and the bypass mode, and executed (ON) in each of the gyro mode and the gyro and the gyro & second controller mode. The bus switch SW1 is connected (Connect) in each of the standby mode and the bypass mode, and isolated (Disconnect) in each of the gyro mode and the gyro & second controller mode.

The expansion connector, that is, the connector 42 is connected with the second controller 36 in each of the bypass mode and the gyro & second controller mode, and is not connected with the controller 36 in each of the standby mode and gyro mode. The Attach1 is controlled to "Low" indicating an unconnected state in the standby mode, and is controlled to "High" indicating a connected state in each of the bypass mode, the gyro mode and the gyro & second controller mode. In relation to the bus address, a special address (#3: described later) is noted only in each of the standby mode and the bypass mode. Moreover, in each of the gyro mode and the gyro & second controller mode, a normal address (#4: described later) is noted.

Referring to FIG. 19(B), the mode when the first controller 34 is started-up, that is, the initial mode of the gyro controller 85C is the standby mode, for example. Here, the initial mode may be the mode except for the standby mode, such as the gyro mode, for example. When the first controller 34 is connected with the second controller 36, the gyro controller 85C makes a transition from the standby mode to the bypass mode. Thereafter, when the second controller 36 is removed, the gyro controller 85C makes a transition from the bypass mode to the standby mode.

On the other hand, the gyro-compatible type application issues a call and triggers a reset to the gyro sensor unit 85C through the wireless module 76 in order to acquire angular velocity data as required. When receiving a call from the application (wireless module 76) in the standby mode, the gyro controller 85C makes a transition to the gyro mode, and when receiving a reset from the application in the gyro mode, the gyro controller 85C makes a transition to the standby mode. The gyro controller 85C makes a transition to the gyro & second controller mode when the second controller 36 is connected in the gyro mode, and makes a transition to the gyro mode when the second controller 36 is removed in the gyro & second controller mode. The gyro controller 85C further makes a transition to the bypass mode when receiving a reset from the application in the gyro & second controller mode, and makes a transition to the gyro & second controller mode when receiving a call from the application in the bypass mode.

Here, in a case that the application is the gyro-non-compatible type, the mode of the gyro controller 85C is merely switched between the standby mode and the bypass mode.

However, the mode control by the gyro controller 85C shown in FIG. 19 is the same as the mode control to be essentially performed by the gyro controller 104C of the gyro sensor unit 100. Accordingly, in a case that the gyro sensor unit 100 is connected to the conventional first controller, the gyro controller 104C executes a mode control as shown in FIG. 19.

However, in a case that the gyro sensor unit 100 is connected to the first controller 34 of this embodiment, the gyro controller 104C performs a mode control as shown in FIG. 20 under the control of the gyro controller 85C. Referring to FIG. 20(A), the contents of the control in the standby mode and the bypass mode are equal to those in the standby mode and the bypass mode as shown in FIG. 19(A), and the contents of the control in the gyro mode and the gyro & second controller mode are equal to those in the standby mode and the bypass mode.

Referring to FIG. 20(B), when the gyro sensor unit 100 is connected to the first controller 34, the gyro controller 104C is started-up, and the mode at this time, that is, the initial mode of the gyro controller 104C is the standby mode, for example. When the gyro sensor unit 100 is connected with the second controller 36 in a state that it is connected to the first controller 34, the gyro controller 85C makes a transition from the standby mode to the bypass mode. Thereafter, when the second controller 36 is removed, the bypass mode is restored to the standby mode. On the other hand, a call and a reset from the application (wireless module 76) to the gyro controller 85C are invalidated by the controller 85C. Thus, the mode transitions to the gyro mode and the gyro & second controller mode cannot be made, and the mode transitions to the standby mode and the bypass mode can only made.

Thus, the gyro controller 104C is controlled by the gyro controller 85C to thereby make transitions between the two modes, such as the standby mode and the bypass mode. More specifically, when the gyro controller 85C is placed in the standby mode or the gyro mode, the gyro controller 104C becomes the standby mode, and when the gyro controller 85C is placed in the bypass mode or the gyro & second controller mode, the gyro controller 104C becomes the bypass mode. As a result, no data is output or data from the second controller 36 is bypassed as it is, and this is not different from the case that the gyro sensor unit 100 is not provided. Thus, even if the gyro sensor unit 100 is applied to the first controller 34 of this embodiment, it is possible to prevent a malfunction, etc. from occurring. Moreover, even if the second controller is connected via the gyro sensor unit 100, a malfunction does not occur.

The control of the microcomputer 94 is explained in detail. The gyro controller 85C of the first controller 34 (microcomputer 94) operates according to flowcharts show in FIG. 21-FIG. 24. Here, the control program corresponding to these flowcharts is stored in the memories 96 or 94c, for example.

Figure 21:
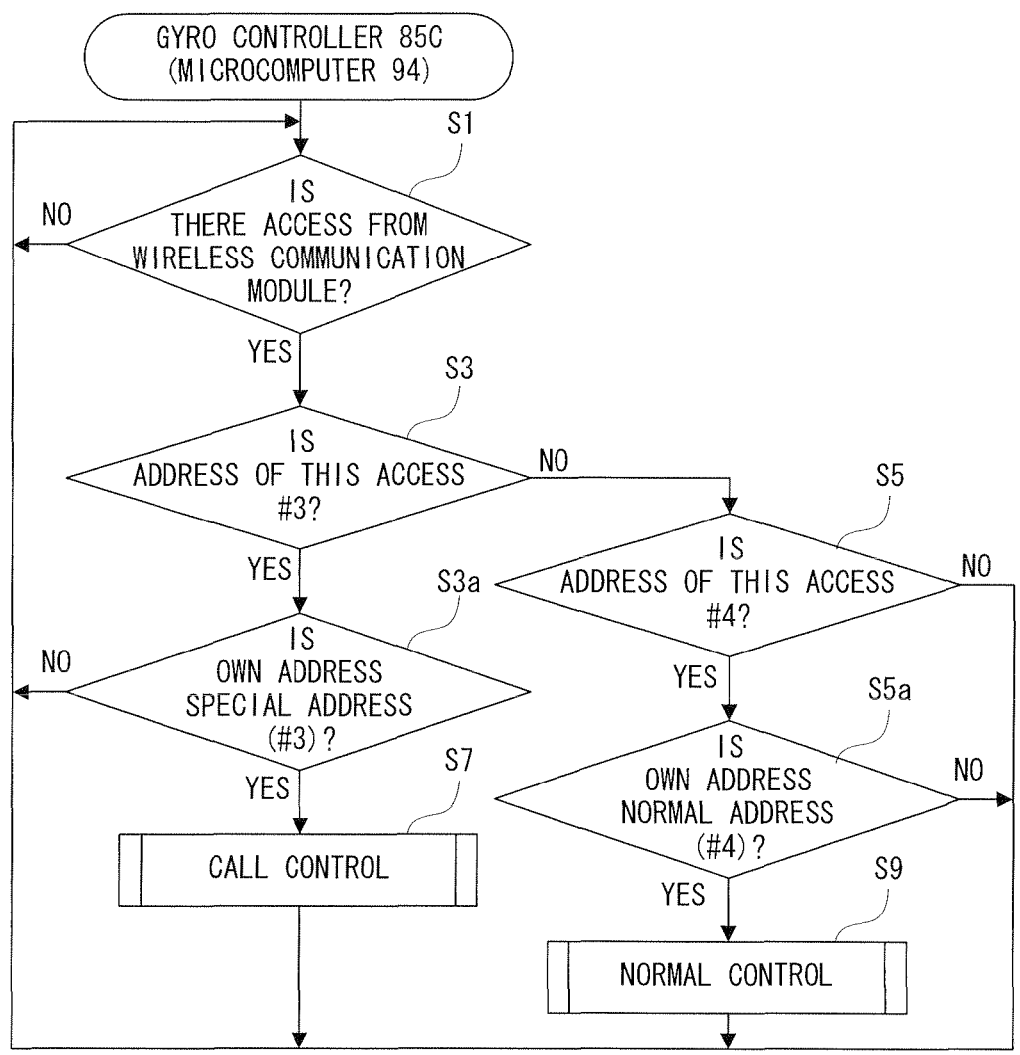
FIG. 21 is a flowchart showing a part of an operation by a microcomputer of the first controller.

Referring to FIG. 21, the microcomputer 94 determines whether or not there is an access from the wireless module 76 in a first step S1. If "NO" in the step S1, similar determination processing is repeated every predetermined time. If "YES" is determined in the step S1, an address (destination) of the access is determined in steps S3 and S5.

Here, a data structure of the access from the wireless module 76 is explained. As shown in FIG. 18(B), the access data includes an address, a R/W, and data. The address is an address (#1, #2, ...) indicating a destination to be accessed on the serial bus 95, and described by 7 bits, for example. The R/W is a command for indicating Read or Write, and described by one bit, for example. The data is information indicating the detail of the R/W, and described by an address indicating writing destination/reading source, and content to be written/content to be read, for example.

For example, access data for which #3 is described in the address (destination), Write is described in the R/W, and a specific address corresponding to the mode transition and mode information to be written in the specific address are described in the data functions as a command for instructing the device whose address is #3, for example, the microcomputer 94 to make a transition from the standby mode or the bypass mode to the gyro mode or the gyro & second controller mode (gyro call). Furthermore, address data for which #3 is described in the address (destination), Read is described in the R/W, and another address corresponding to reading of the device information is described in the data functions as a command for instructing the device whose address is #3, for example, the microcomputer 94 to output the device information (reading in view of the wireless module 76).

Returning to FIG. 21, it is determined whether or not the address (destination) of the access is #3 in the step S3, and it is determined whether or not the address (destination) of the access is #4 in the step S5. If the determination result in the steps S3 and S4 is "NO", the access is regarded as not being an access to the gyro controller 85C, and the process returns to the step S1.

If "YES" is determined in the step S3, the process shifts to a step S3a to further determine whether or not its own address is #3. If "YES" here, a call control (see FIG. 22) is executed in a step S7, and then, the process returns to the step S1. If "NO" in the step S3a, since the gyro function has already been activated, it is regarded that call processing is not required, and the process returns to the step S1.

If "YES" is determined in the step S5, the process shifts to a step S5a to further determine whether or not its own address is #4. If "YES" here, a main control (see FIG. 24) is executed in a step S9, and then, the process returns to the step S1. If "NO" in the step S5a, since the gyro function has not yet been activated, it is regarded that a normal control is not required, and the process returns to the step S1.

Figure 22:
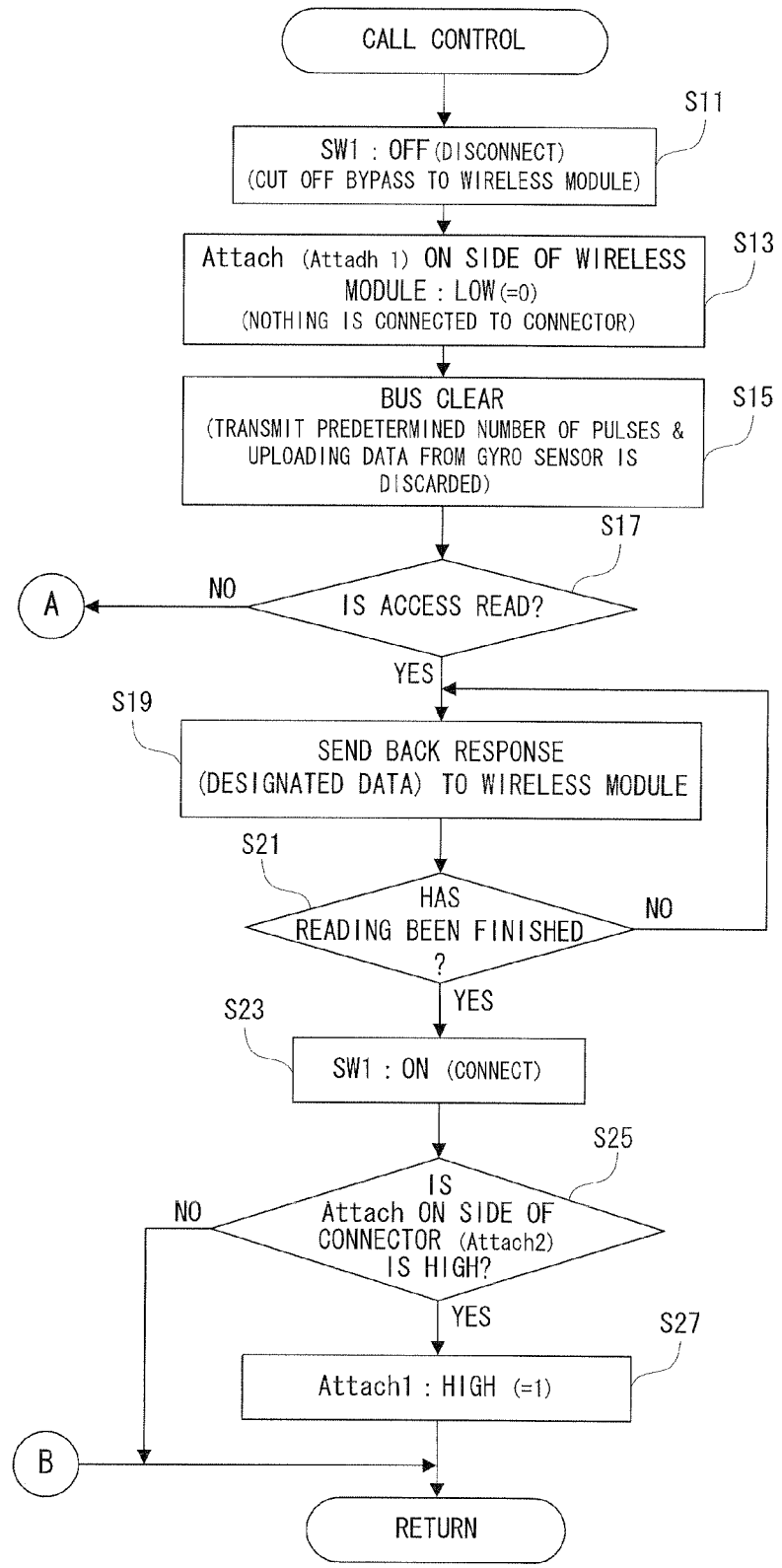
FIG. 22 is a flowchart showing another part of the operation by the microcomputer of the first controller.
Figure 23:
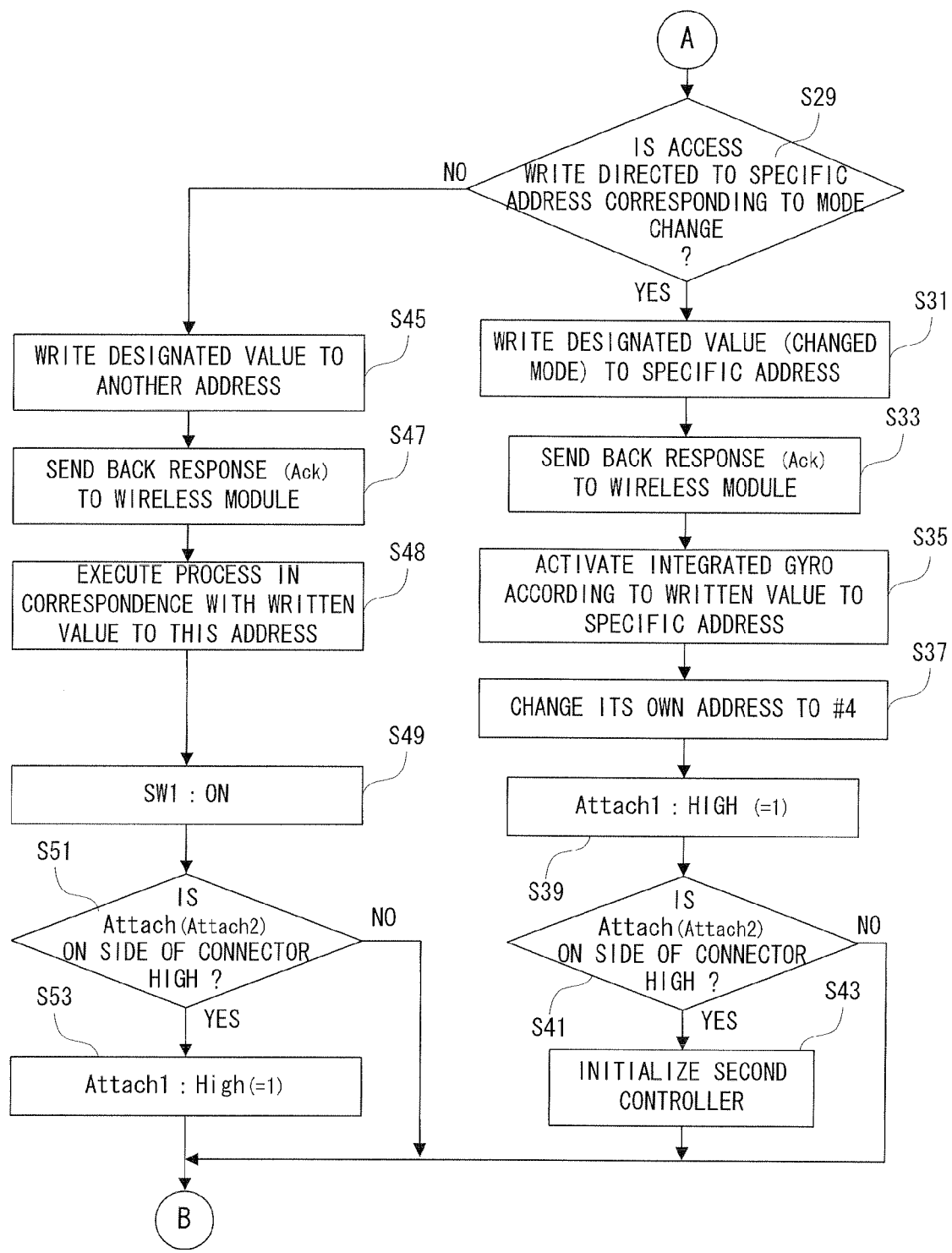
FIG. 23 is a flowchart showing a still another part of the operation by the microcomputer of the first controller.

The call control in the aforementioned step S7 is executed according to a subroutine shown in FIG. 22 and FIG. 23. Referring to FIG. 22, the microcomputer 94 first turns the switch SW1 off (Disconnect) in a step S11. This cuts off the bypass from the side of the connector 42 (the expansion device connected thereto) to the wireless module 76 of the serial bus 95, and thus, the access cannot reach the connector 42 except for a head section (address, etc.: see FIG. 18(B)). That is, at a time when the access from the wireless module 76 is an access to the #3 address indicating its own address, that is, when the head section is transmitted to the serial bus 95, the switch SW1 is turned off (Disconnect), and therefore, the data indicating the content of the control to be transmitted to the side of the connector 42 thereafter is cut off. Furthermore, even if a response to the access is sent from the microcomputer 102, the response data does not reach the wireless module 76, and can be subjected to processing such as discarding, etc. in the microcomputer 94.

Next, in a step S13, the Attach on the side of the wireless module 76, that is, the Attach1 (see FIG. 15) is set to Low. This makes the gyro sensor 85 invisible from the wireless module 76.

Then, in a step S15, bus clear processing is performed on the serial bus 95. More specifically, a predetermined number of clock pulses are sent to the serial bus 95, and in response thereto, the data set to the serial bus 95 is discarded. The head section of this access is also detected by the microcomputer 102 to which the #3 address is similarly assigned as described before, and therefore, the microcomputer 102 may have any response. Hereupon, the bus clear processing is executed to cancel the access, if the microcomputer 102 has data to be responded, to make the microcomputer 102 output it, to discard the data transmitted to the microcomputer 94 via the serial bus 95 without receiving it and to return the microcomputer 102 to the original state.

After completion of the bus clear processing, the process proceeds to a step S17 to determine whether or not the access is the Read. If "NO" here, that is, the Write, the process shifts to a step S29 (see FIG. 23: described later). If "YES" in the step S17, that is, if the Read, a response (data designated as an object to be read, for example, data indicating the state of the gyro, etc.) is sent back to the wireless module 76 in a step S19. Then, in a next step S21, it is determined whether or not the designated data has already been sent back (reading has been finished), and if "NO", the process returns to the step S19 to repeat similar processing.

If "YES" in the step S21, the process proceeds to a step S23 to turn the switch SW1 on (Connect). This restores the bypass of the serial bus 95 from the side of the connector 42 to the wireless module 76.

Next, in a step S25, it is determined whether or not the Attach on the side of the connector 42, that is, the Attach2 (see FIG. 15) is High, and if "NO", that is, if the Attach2 is Low, the process is restored to the main routine (see FIG. 21) as it is (Attach1 remains to be Low). If "YES" in the step S25, that is, if the Attach2 is High, the Attach1 is made High in a step S27, and the process is restored to the main routine.

The processing when it is determined that the access is the Write in the aforementioned step S17 is as follows. Referring to FIG. 23, the microcomputer 94 determines whether or not this access is the Write directed to a specific address in correspondence with the mode transition, briefly, determines whether a command for instructing a mode transition or not in a step S29. If "NO" here, that is, in a case of the Write directed to another address, the process shifts to a step S45 (described later).

If "YES" in the step S29, that is, in a case of the Write directed to a specific address, the process proceeds to a step S31 to write the designated value, that is, the changed mode information ("gyro mode" or "gyro & second controller mode") in this specific address. Next, a response (Ack) is sent back to the wireless module 76 in a step S33, and in accordance with the updated mode information, the integrated gyro, that is, the gyro sensor 85 is activated in a step S35. In accordance with the gyro being activated, its own address is changed from #3 to #4 in a step S37, and Attach1 is made High in a step S39. Because the Attach1 is High, it is recognized that the gyro sensor 85 is connected to the wireless module 76.

Next, in a step S41, it is determined whether or not the Attach2 is High, and if "NO", that is, if the Attach2 is Low, the process is restored to the main routine (see 21) without any change. If "YES" in the step S41, that is, if the Attach2 is High, the second controller 36 is initialized in a step S43, and then, the process is restored to the main routine.

The processing when "NO" is determined in the aforementioned step S29 is as follows. The microcomputer 94 writes the designated value in another address in a step S45. Next, a response (Ack) is returned to the wireless module 76 in a step S47, and processing in correspondence with the written value to this address is executed in a step S48, and the switch SW1 is turned on (Connect) in a step S49.

Next, in a step S51, it is determined whether or not the Attach2 is High, and if "NO", that is, if the Attach2 is Low, the process is restored to the main routine without any change. If "YES" in the step S51, that is, if the Attach2 is High, the Attach1 is made High in the step S43, and then, the process is restored to the main routine.

Figure 24:
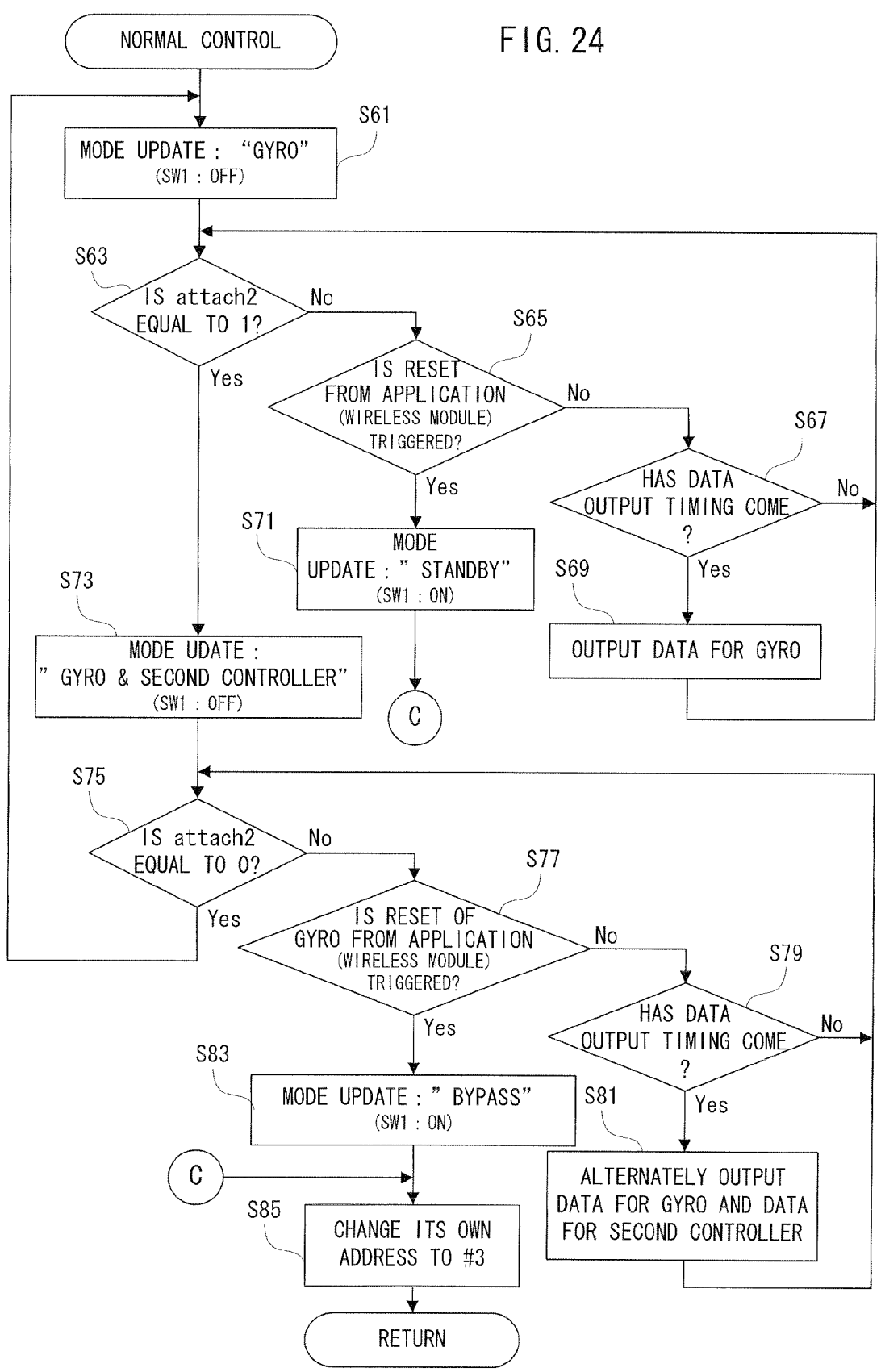
FIG. 24 is a flowchart showing a further part of the operation by the microcomputer of the first controller.

The normal control in the aforementioned step S9 is executed according to a subroutine shown in FIG. 24, for example. Referring to FIG. 24, the microcomputer 94 first performs a mode update to the gyro mode in a step S61. More specifically, according to the definition of "gyro" described in the table (FIG. 19(A)) within the memory 94c, the gyro function is activated to start a power supply to the gyro sensor 85, to cut off (OFF) the bus switch SW1, to stop the connector 42, to control the Attach1 to "High" (=1), and to start a notice to the normal address (#4) by the serial bus 95. Here, if the gyro mode has already been established, all or a part of such mode updating processing may be omitted. When the gyro controller 85C makes a transition to the gyro mode, the process enters the loop from steps S63 to S67.

It is determined whether or not the Attach2 is "1", that is, High in the step S63, it is determined whether or not the application triggers a reset in the step S65, and it is determined whether or not the current time corresponds to a data output timing in the step S67. If a preset time elapses from the previous data output, the determination result in the step S67 becomes "YES", and the process shifts to a step S69. In the step S69, the microcomputer 94 outputs the data for gyro (FIG. 17(A)) from the gyro sensor 85 to the side of the wireless module 76. After the output, the process returns to the loop from the steps S63 to S67.

When the application triggers a reset (through the wireless module 76), the determination result in the step S65 becomes "YES", and the process shifts to a step S71. In the step S71, the mode update to the standby mode is performed. In the mode update, the definition of "standby" described in the table (FIG. 19(A)) within the memory 94c is referred. Thus, the switch SW1 is placed in an ON state. When the gyro controller 85C thus makes a transition to the standby mode, the process proceeds to a step S85 (described later).

When the Attach2 is changed from "0" to "1", the determination result in the step S63 becomes "YES", and the process shifts to a step S73. In the step S73, a mode update to the gyro & second controller mode is performed. In the mode update, the definition of the "gyro & second controller" described in the table (FIG. 19(A)) within the memory 94c is referred. Thus, the switch SW1 is placed in an OFF state. When the gyro controller 85C thus makes a transition to the gyro & second controller mode, the process enters a loop from steps S75 to S79.

It is determined whether or not the Attach2 is "0", that is, Low in the step S75, it is determined whether or not the application triggers a reset in the step S77, and it is determined whether or not the current time corresponds to a data output timing in the step S79. When a preset time elapses from the previous data output, the determination result in the step S79 becomes "YES", and the process shifts to a step S81. In the step S81, the microcomputer 94 alternately outputs the data for gyro (FIG. 17(A)) and the data for second controller (FIG. 17(B)) to the side of the wireless module 76. After the output, the process returns to the loop from the steps S75 to S79.

When the application triggers a reset, the determination result in the step S77 becomes "YES", and the process shifts to a step S83. In the step S83, a mode update to the bypass mode is performed. In the mode update, the definition of "bypass" described in the table (FIG. 19(A)) within the memory 94c is referred. Thus, the switch SW1 is in an "ON state". When the gyro controller 85C thus makes a transition to the bypass mode, the process proceeds to a step S85.

When the Attach2 changes from "1" to "0", the determination result in the step S75 becomes "YES", and the process returns to the step S61.

In the step S85 following the aforementioned step S71 or S83, its own address is changed to the special #3 address for call control. After the change of the address, the process is restored to the main routine (see FIG. 21).

As understood from the above description, in the first controller 34 of this embodiment, the input portions, such as the operating portion 80, the acceleration sensor 84, etc. are controlled, and the wireless module 76 for acquiring data is connected to a predetermined bus, such as the serial bus 95, for example. The serial bus 95 can be connected with the gyro sensor unit 100 via the connector 42. The connection of the serial bus 95 from the connector 42 to the wireless module 76 is turned on and off by the switch SW1. The data acquired from the gyro sensor 85 having a function equivalent to that of the gyro sensor unit 100 is transmitted to the wireless module 76 through the serial bus 95 by the microcomputer 94 which is connected to the side of the wireless module 76 and the side of the connector 42 of the serial bus 95 without interposing the switch SW1, and controls the switch SW1 on or off. The microcomputer 94 turns the connection of the switch SW1 off (S11) when having an access from the wireless module 76.

According to this embodiment, in response to an access form the wireless module 76 to the microcomputer 94, a connection from the connector 42 to the wireless module 76 is turned off, so that even if the gyro sensor unit 100 is connected to the connector 42, a problem, such as data contention between the gyro sensor 85 and the gyro sensor unit 100 can be prevented. Thus, the shape of the housing is common, so that compatibility with the gyro sensor unit 100 is maintained.

Additionally, in this embodiment, the first controller 34 and the second controller 36 are connected by the cable 38, but may be connected by a wireless communication.

Moreover, the names of buses, the address values, the data formats, etc. mentioned above are merely one example and may be changed as necessary.

In the above description, the explanation is made by using the game system 10 as one example, but the present invention can be applied to an information processing system which executes information processing according to an application like a game on the basis of the data from the input device (input portion).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input device transmitting input data from at least one input portion to an information processing apparatus, the input device of the type that can optionally be connected to an external expansion device including a gyrosensor, the input device comprising:
    a controller which is connected to a bus, controls said input portion, and acquires data;
    an expansion connector which connects various devices including the external expansion device to said bus;
    a switcher which selectively switches a connection of said bus from said expansion connector to said controller;
    an internal gyrosensor which is functionally equivalent to said external expansion device gyrosensor; and
    a sensor controller configured to transmit data acquired from said internal gyrosensor to said controller via said bus, and is connected to a side of said controller and a side of said expansion connector of said bus without interposing said switcher, and is further configured to control said switcher, wherein said sensor controller switches the connection of said switcher off whenever the controller accesses itself to thereby disconnect the external expansion device gyrosensor from the bus.

2. An input device according to claim 1, wherein said sensor controller transmits a signal for transmitting data from said external expansion device to the side of said expansion connector, and discards data transmitted on the basis of said signal from said expansion connector when an access from said controller to itself is made.

3. An input device according to claim 1, wherein as to an access from said controller, a content of an instruction is transmitted following information indicating an object to be accessed, and
    said sensor controller determines whether or not the object to be accessed from said controller is itself, and switches the connection of said switcher off before the instruction from said controller is transmitted to said expansion connector if the object to be accessed from said controller is itself.

4. An input device according to claim 3, wherein said sensor controller has a plurality of modes including at least a mode in which said internal gyrosensor is used and a mode in which said internal gyrosensor is not used, and makes a mode transition, activates said internal gyrosensor, and transmits data from said internal gyrosensor to said controller thereafter if the content of the instruction from said controller is a mode transition from the mode in which said internal gyrosensor is not used to the mode in which said internal gyrosensor is used.

5. An input device according to claim 4, wherein said sensor controller, if other device is connected via said expansion connector in the mode in which said internal gyrosensor is used, acquires data from the other device, and alternately transmits the data from said other device and data acquired from said internal gyrosensor to said controller.

6. An input device according to claim 4, wherein said sensor controller further switches the connection of said switcher on when a mode transition to the mode in which said internal gyrosensor is not used is instructed from said controller in the mode in which said internal gyrosensor is used.

7. An input device according to claim 3, wherein the information indicating the object to be accessed and the content of the instruction when the object to be accessed from said controller is itself is the same signal as that for controlling said external expansion device.

8. A non-transitory storage medium storing a sensor controlling program to be executed by a processor in an input device of the type that can optionally be connected to an external expansion device including a gyrosensor, the input device transmitting input data from at least one input portion to an information processing apparatus, the input device comprising:
    a controller which is connected to a predetermined bus, controls said input portion, and acquires data;
    an expansion connector which connects various devices including a predetermined external expansion device to said bus;
    a switcher which switches on or off a connection of said bus from said expansion connector to said controller;
    an internal gyrosensor which has a function being equivalent to that of said external expansion device; and
    a sensor controlling computer which transmits data acquired from said internal gyrosensor to said controller via said bus, is connected to a side of said controller and a side of said expansion connector of said bus without interposing said switcher, and controls said switcher on or off, wherein said sensor controlling program includes instructions that when executed by the sensor controlling computer causes said sensor controlling computer to turn the connection of said switcher off when an access to itself is made from said controller.

9. In an input device of the type that can optionally be connected to an external expansion device including a gyrosensor, a method of operating the input device comprising:
    transmitting input data from at least one input portion of the input device to an information processing apparatus;
    using a controller which is connected to a bus of the input device to control said input portion and acquire data;
    using an expansion connector to connect various devices including the external expansion device to said bus;
    selectively switching a connection of said bus from said expansion connector to said controller;
    sensing a parameter with an internal gyrosensor within the input device, the internal gyrosensor being functionally equivalent to said external expansion device gyrosensor; and
    transmitting, with a sensor controller of the input device connected to a side of said controller and a side of said expansion connector of said bus without interposing said switching, data acquired from said internal gyrosensor to said controller via said bus, and using the sensor controller to control said switching of the connection off whenever the controller accesses itself over the bus to thereby disconnect the external expansion device from the bus.

10. The method of claim 9 wherein the controller accesses itself over the bus by accessing an address indicating its own address.

11. A handheld controller comprising:

a housing configured to be held in the hand, the housing having first and second ends;

an optical sensor disposed at the housing first end, the optical sensor being structured to detect infrared targets and providing coordinates thereof;

an accelerometer disposed within the housing, the accelerometer measuring acceleration;

a gyrosensor disposed within the housing, the gyrosensor measuring angular rate;

an expansion connector disposed at the housing second end, the expansion connector being configured to optionally accept and connect to an expansion module containing an additional gyrosensor; and a wireless controller within the housing and coupled to the optical sensor, the accelerometer, the gyrosensor and the expansion connector, the wireless controller being configured to wirelessly communicate the coordinates, the measured acceleration and the measured angular rate to a device remote to the handheld controller in response to commands the wireless controller wirelessly receives, the wireless controller being further configured to process a wireless command to use the additional gyrosensor in the expansion module by bypassing the additional gyrosensor and instead reporting data from the gyrosensor within the housing.

\* \* \* \* \*